(12) United States Patent
Walters et al.

(10) Patent No.: US 8,010,319 B2
(45) Date of Patent: *Aug. 30, 2011

(54) LIGHT MANAGEMENT SYSTEM HAVING NETWORKED INTELLIGENT LUMINAIRE MANAGERS

(75) Inventors: Jeff D. Walters, Marshfield, MA (US); Charles J. Darnell, Decatur, GA (US); Zachary S. Gibler, Granville, OH (US); David A. Henderson, Granville, OH (US); Michael M. Minarczyk, Granville, OH (US); William Eric Holland, Lynchburg, VA (US)

(73) Assignee: ABL IP Holding LLC, Conyers, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/839,298

(22) Filed: Jul. 19, 2010

(65) Prior Publication Data
US 2010/0287081 A1 Nov. 11, 2010

Related U.S. Application Data

(63) Continuation of application No. 12/028,597, filed on Feb. 8, 2008, now Pat. No. 7,761,260, which is a continuation of application No. 11/518,495, filed on Sep. 11, 2006, now Pat. No. 7,333,903.

(60) Provisional application No. 60/715,584, filed on Sep. 12, 2005.

(51) Int. Cl.
*G06F 15/00* (2006.01)
*G05B 11/01* (2006.01)
*G05B 15/00* (2006.01)
*G05B 23/02* (2006.01)

(52) U.S. Cl. ............... 702/183; 700/17; 700/83; 340/3.1

(58) Field of Classification Search .................. 702/183, 702/188; 700/17, 83; 340/286.02, 870.02; 315/119, 131
See application file for complete search history.

(56) References Cited

U.S. PATENT DOCUMENTS
3,149,317 A 9/1964 Brugliera et al.
3,747,104 A 7/1973 Pansini
(Continued)

FOREIGN PATENT DOCUMENTS
CA 2419118 A1 8/2003
(Continued)

OTHER PUBLICATIONS

Xin-Ming Huang, "Wireless Sensor Network for Streetlight Monitoring and Control." Digital Wireless Communications VI, Proceedings of SPIE, vol. 5440, 2004. 313-321.
(Continued)

*Primary Examiner* — Bryan Bui
(74) *Attorney, Agent, or Firm* — Sutherland Asbill & Brennan LLP

(57) ABSTRACT

A network operation center for a light management system having networked intelligent luminaire managers. A plurality of networked luminaire managers, each collocated with a respective luminaire, monitor the status of their respective luminaires. The luminaire managers include transmitters for transmitting status information about their respective luminaires and third-party devices to a network server. The network server forwards the received status information from the networked luminaire managers to a computer of an owner/operator of the plurality of luminaires and/or a third-party user. The luminaire managers communicate with each other, whereby they form a network.

20 Claims, 15 Drawing Sheets

U.S. PATENT DOCUMENTS

| | | |
|---|---|---|
| 4,575,660 A | 3/1986 | Zaharchuk et al. |
| 4,691,341 A | 9/1987 | Knoble et al. |
| 4,694,223 A | 9/1987 | Campolo |
| 4,727,296 A | 2/1988 | Zaharchuk et al. |
| 4,924,151 A | 5/1990 | D'Aleo et al. |
| 4,980,806 A | 12/1990 | Taylor et al. |
| 4,988,920 A | 1/1991 | Hoeksma |
| 4,998,095 A | 3/1991 | Shields |
| 5,051,727 A | 9/1991 | Fockens |
| 5,095,502 A | 3/1992 | Finzel |
| 5,187,655 A | 2/1993 | Post et al. |
| 5,191,265 A | 3/1993 | D'Aleo et al. |
| 5,209,560 A | 5/1993 | Taylor et al. |
| 5,248,919 A | 9/1993 | Hanna et al. |
| 5,357,170 A | 10/1994 | Luchaco et al. |
| 5,399,940 A | 3/1995 | Hanna et al. |
| 5,430,356 A | 7/1995 | Ference et al. |
| 5,452,294 A | 9/1995 | Natarajan |
| 5,463,286 A | 10/1995 | D'Aleo et al. |
| 5,473,202 A | 12/1995 | Mudge et al. |
| 5,479,159 A | 12/1995 | Kelly et al. |
| 5,487,088 A | 1/1996 | Weltz et al. |
| 5,498,931 A | 3/1996 | Bedocs |
| 5,506,715 A | 4/1996 | Zhu |
| 5,530,322 A | 6/1996 | Ference et al. |
| 5,565,855 A | 10/1996 | Knibbe |
| 5,623,256 A | 4/1997 | Marcoux |
| 5,637,964 A | 6/1997 | Hakkarainen et al. |
| 5,648,656 A | 7/1997 | Begermann et al. |
| 5,652,751 A | 7/1997 | Sharony |
| 5,654,968 A | 8/1997 | Smirolda |
| 5,668,446 A | 9/1997 | Baker |
| 5,668,537 A | 9/1997 | Chansky et al. |
| 5,699,243 A | 12/1997 | Eckel et al. |
| 5,701,117 A | 12/1997 | Platner et al. |
| 5,721,471 A | 2/1998 | Begermann et al. |
| 5,726,644 A | 3/1998 | Jednacz et al. |
| 5,769,527 A | 6/1998 | Taylor et al. |
| 5,770,928 A | 6/1998 | Chansky et al. |
| 5,798,581 A | 8/1998 | Keagy et al. |
| 5,805,593 A | 9/1998 | Busche |
| 5,808,417 A | 9/1998 | Ference et al. |
| 5,811,785 A | 9/1998 | Heinman et al. |
| 5,811,942 A | 9/1998 | Pedretti |
| 5,812,422 A | 9/1998 | Lyons |
| 5,861,717 A | 1/1999 | Befermann et al. |
| 5,864,184 A | 1/1999 | Platner |
| 5,874,903 A | 2/1999 | Shuey et al. |
| 5,884,181 A | 3/1999 | Arnold et al. |
| 5,886,423 A | 3/1999 | Gershen et al. |
| 5,898,384 A | 4/1999 | Alt et al. |
| 5,905,442 A | 5/1999 | Mosebrook et al. |
| 5,909,087 A | 6/1999 | Bryde et al. |
| 5,919,239 A | 7/1999 | Fraker et al. |
| 5,959,275 A | 9/1999 | Hughes et al. |
| 5,959,549 A | 9/1999 | Synesiou et al. |
| 5,962,989 A | 10/1999 | Baker |
| 5,962,991 A | 10/1999 | Levy |
| 5,962,992 A | 10/1999 | Huang et al. |
| 5,963,546 A | 10/1999 | Shoji |
| 5,971,597 A | 10/1999 | Baldwin et al. |
| 5,978,364 A | 11/1999 | Melnik |
| 5,986,574 A | 11/1999 | Colton |
| 5,990,635 A | 11/1999 | Ference et al. |
| 6,016,038 A | 1/2000 | Mueller et al. |
| 6,028,396 A | 2/2000 | Morrissey, Jr. et al. |
| 6,028,853 A | 2/2000 | Haartsen |
| 6,035,266 A | 3/2000 | Williams et al. |
| 6,037,721 A | 3/2000 | Lansing et al. |
| 6,044,062 A | 3/2000 | Brownrigg et al. |
| 6,046,550 A | 4/2000 | Ference et al. |
| 6,046,992 A | 4/2000 | Meier et al. |
| 6,078,251 A | 6/2000 | Landt et al. |
| 6,119,076 A | 9/2000 | Williams et al. |
| 6,124,806 A | 9/2000 | Cunningham et al. |
| 6,130,881 A | 10/2000 | Stiler et al. |
| 6,157,943 A | 12/2000 | Meyer |
| 6,160,359 A | 12/2000 | Fleischmann |
| 6,169,377 B1 | 1/2001 | Bryde et al. |
| 6,172,468 B1 | 1/2001 | Hollander |
| 6,174,073 B1 | 1/2001 | Regan et al. |
| 6,181,086 B1 | 1/2001 | Katyl et al. |
| 6,188,181 B1 | 2/2001 | Sinha et al. |
| 6,192,053 B1 | 2/2001 | Angelico et al. |
| 6,195,018 B1 | 2/2001 | Ragle et al. |
| 6,215,398 B1 | 4/2001 | Platner et al. |
| 6,239,722 B1 | 5/2001 | Colton et al. |
| 6,249,516 B1 | 6/2001 | Brownrigg et al. |
| 6,275,707 B1 | 8/2001 | Reed et al. |
| 6,285,912 B1 | 9/2001 | Ellison et al. |
| 6,300,727 B1 | 10/2001 | Bryde et al. |
| 6,301,257 B1 | 10/2001 | Johnson et al. |
| 6,304,180 B1 | 10/2001 | Platner et al. |
| 6,304,556 B1 | 10/2001 | Haas |
| 6,310,440 B1 | 10/2001 | Lansing et al. |
| 6,316,889 B1 | 11/2001 | Chansky et al. |
| 6,333,605 B1 | 12/2001 | Grouev |
| 6,340,864 B1 | 1/2002 | Wacyk |
| 6,349,091 B1 | 2/2002 | Li |
| 6,369,704 B2 | 4/2002 | Hilleary |
| 6,370,489 B1 | 4/2002 | Williams et al. |
| 6,373,399 B1 | 4/2002 | Johnson et al. |
| 6,377,001 B2 | 4/2002 | Levy |
| 6,380,696 B1 | 4/2002 | Sembhi et al. |
| 6,388,396 B1 | 5/2002 | Katyl et al. |
| 6,388,399 B1 | 5/2002 | Eckel et al. |
| 6,392,368 B1 | 5/2002 | Deller et al. |
| 6,393,381 B1 | 5/2002 | Williams et al. |
| 6,396,216 B1 | 5/2002 | Noone et al. |
| 6,415,245 B2 | 7/2002 | Williams et al. |
| 6,424,270 B1 | 7/2002 | Ali |
| 6,437,692 B1 | 8/2002 | Petite et al. |
| 6,441,565 B1 | 8/2002 | Levy |
| 6,452,339 B1 | 9/2002 | Morriseey et al. |
| 6,453,687 B2 | 9/2002 | Sharood et al. |
| 6,456,960 B1 | 9/2002 | Williams et al. |
| 6,462,654 B1 | 10/2002 | Sandelman et al. |
| 6,496,012 B1 | 12/2002 | Weng et al. |
| 6,499,114 B1 | 12/2002 | Almstead et al. |
| 6,507,158 B1 | 1/2003 | Wang et al. |
| 6,509,828 B2 | 1/2003 | Bolavage et al. |
| 6,509,841 B1 | 1/2003 | Colton et al. |
| 6,512,455 B2 | 1/2003 | Finn et al. |
| 6,528,954 B1 | 3/2003 | Lys et al. |
| 6,535,498 B1 | 3/2003 | Larsson et al. |
| 6,545,434 B2 | 4/2003 | Sembhi et al. |
| 6,548,967 B1 | 4/2003 | Dowling et al. |
| 6,552,525 B2 | 4/2003 | Bessler |
| 6,553,020 B1 | 4/2003 | Hughes et al. |
| 6,574,227 B1 | 6/2003 | Rosenberg et al. |
| 6,581,837 B1 | 6/2003 | Hattersley |
| 6,587,046 B2 | 7/2003 | Joao |
| 6,603,276 B2 | 8/2003 | Chansky et al. |
| 6,604,062 B2 | 8/2003 | Williams et al. |
| 6,608,453 B2 | 8/2003 | Morgan et al. |
| 6,614,013 B2 | 9/2003 | Pitigoi-Aron et al. |
| 6,617,560 B2 | 9/2003 | Forke |
| 6,633,823 B2 | 10/2003 | Bartone et al. |
| 6,636,005 B2 | 10/2003 | Wacyk et al. |
| 6,640,087 B2 | 10/2003 | Reed et al. |
| 6,640,253 B2 | 10/2003 | Schaefer |
| 6,667,578 B2 | 12/2003 | Lansing et al. |
| 6,704,283 B1 | 3/2004 | Stiller et al. |
| 6,714,895 B2 | 3/2004 | Williams et al. |
| 6,717,376 B2 | 4/2004 | Lys et al. |
| 6,717,660 B1 | 4/2004 | Bernardo |
| 6,724,159 B2 | 4/2004 | Gutta et al. |
| 6,731,079 B2 | 5/2004 | Anderston |
| 6,734,642 B1 | 5/2004 | Reverberi |
| 6,744,740 B2 | 6/2004 | Chen |
| 6,744,766 B2 | 6/2004 | Alapuranen |
| 6,744,771 B1 | 6/2004 | Barber et al. |
| 6,751,455 B1 | 6/2004 | Acampora |
| 6,754,192 B2 | 6/2004 | Kennedy |
| 6,757,268 B1 | 6/2004 | Zendle |
| 6,771,666 B2 | 8/2004 | Barker, Jr. |
| 6,774,584 B2 | 8/2004 | Lys et al. |

| Patent | Date | Inventor |
|---|---|---|
| 6,777,891 B2 | 8/2004 | Lys et al. |
| 6,781,329 B2 | 8/2004 | Mueller et al. |
| 6,794,830 B2 | 9/2004 | Lansing et al. |
| 6,803,728 B2 | 10/2004 | Balasubramaniam et al. |
| 6,806,813 B1 | 10/2004 | Cheng et al. |
| 6,807,165 B2 | 10/2004 | Belcea |
| 6,807,516 B2 | 10/2004 | Williams et al. |
| 6,808,279 B2 | 10/2004 | Greiner |
| 6,836,737 B2 | 12/2004 | Petite et al. |
| 6,841,944 B2 | 1/2005 | Morrissey et al. |
| 6,842,668 B2 | 1/2005 | Carson et al. |
| 6,845,274 B2 | 1/2005 | Wang |
| 6,850,502 B1 | 2/2005 | Kagan et al. |
| 6,859,644 B2 | 2/2005 | Wang |
| 6,867,707 B1 | 3/2005 | Kelley et al. |
| 6,869,204 B2 | 3/2005 | Morgan et al. |
| 6,870,846 B2 | 3/2005 | Cain |
| 6,879,574 B2 | 4/2005 | Naghian et al. |
| 6,888,322 B2 | 5/2005 | Dowling et al. |
| 6,888,323 B1 | 5/2005 | Null et al. |
| 6,891,838 B1 | 5/2005 | Petite |
| 6,892,168 B2 | 5/2005 | Williams et al. |
| 6,897,624 B2 | 5/2005 | Lys et al. |
| 6,917,985 B2 | 7/2005 | Madruga et al. |
| 6,927,547 B2 | 8/2005 | Walko et al. |
| 6,930,455 B2 | 8/2005 | Chansky et al. |
| 6,933,486 B2 | 8/2005 | Pitigoi-Aron et al. |
| 6,933,685 B2 | 8/2005 | Gutta et al. |
| 6,936,978 B2 | 8/2005 | Morgan et al. |
| 6,937,985 B2 | 8/2005 | Kuma |
| 6,944,131 B2 | 9/2005 | Beshai et al. |
| 6,963,285 B2 | 11/2005 | Fischer et al. |
| 6,965,205 B2 | 11/2005 | Piepgras et al. |
| 6,965,568 B1 | 11/2005 | Larsen |
| 6,965,575 B2 | 11/2005 | Srikrishna et al. |
| 6,967,448 B2 | 11/2005 | Morgan et al. |
| 6,969,954 B2 | 11/2005 | Lys |
| 6,970,444 B2 | 11/2005 | Chwieseni et al. |
| 6,975,079 B2 | 12/2005 | Lys et al. |
| 6,977,937 B1 | 12/2005 | Weistein et al. |
| 6,980,537 B1 | 12/2005 | Liu |
| 6,982,982 B1 | 1/2006 | Barker, Jr. et al. |
| 6,993,325 B1 | 1/2006 | Waesterlid |
| 7,012,520 B2 | 3/2006 | Webb, Sr. |
| 7,012,546 B1 | 3/2006 | Zigdon et al. |
| 7,027,808 B2 | 4/2006 | Wesby |
| 7,031,920 B2 | 4/2006 | Dowling et al. |
| 7,046,149 B1 | 5/2006 | Badenhop et al. |
| 7,050,808 B2 | 5/2006 | Janusz et al. |
| 7,064,498 B2 | 6/2006 | Dowling et al. |
| 7,071,634 B2 | 7/2006 | Johnson et al. |
| 7,075,254 B2 | 7/2006 | Chitta et al. |
| 7,084,581 B2 | 8/2006 | Honma et al. |
| 7,109,668 B2 | 9/2006 | Pogodayev et al. |
| 7,113,541 B1 | 9/2006 | Lys et al. |
| 7,119,676 B1 | 10/2006 | Siverstrim et al. |
| 7,122,976 B1 | 10/2006 | Null et al. |
| 7,126,291 B2 | 10/2006 | Kruse et al. |
| 7,135,824 B2 | 11/2006 | Lys et al. |
| 7,135,956 B2 | 11/2006 | Bartone et al. |
| 7,148,800 B2 | 12/2006 | Cunningham et al. |
| 7,161,213 B2 | 1/2007 | Ito et al. |
| 7,164,110 B2 | 1/2007 | Pitigoi-Aron et al. |
| 7,166,970 B2 | 1/2007 | Johnson et al. |
| 7,167,777 B2 | 1/2007 | Budike, Jr. |
| 7,170,238 B2 | 1/2007 | Adamson et al. |
| 7,172,328 B2 | 2/2007 | Hoelen et al. |
| 7,180,251 B2 | 2/2007 | Van Eerden |
| 7,184,905 B2 | 2/2007 | Stefan |
| 7,186,003 B2 | 3/2007 | Dowling et al. |
| 7,187,141 B2 | 3/2007 | Mueller et al. |
| 7,190,124 B2 | 3/2007 | Kumar et al. |
| 7,190,125 B2 | 3/2007 | McDonough et al. |
| 7,211,968 B2 | 5/2007 | Adamson et al. |
| 7,231,060 B2 | 6/2007 | Dowling et al. |
| 7,242,152 B2 | 7/2007 | Dowling et al. |
| 7,253,566 B2 | 8/2007 | Lys et al. |
| 7,333,903 B2 | 2/2008 | Walters et al. |
| 7,529,594 B2 | 5/2009 | Walters et al. |
| 7,546,168 B2 * | 6/2009 | Walters et al. ............ 700/17 |
| 2001/0005368 A1 | 6/2001 | Rune |
| 2001/0034793 A1 | 10/2001 | Madruga et al. |
| 2001/0040805 A1 | 11/2001 | Lansing et al. |
| 2002/0002444 A1 | 1/2002 | Williams et al. |
| 2002/0008621 A1 | 1/2002 | Barritz et al. |
| 2002/0009975 A1 | 1/2002 | Janusz et al. |
| 2002/0013679 A1 | 1/2002 | Petite |
| 2002/0013856 A1 | 1/2002 | Garcia-Luna-Aceves et al. |
| 2002/0016767 A1 | 2/2002 | Johnston |
| 2002/0044549 A1 | 4/2002 | Johansson et al. |
| 2002/0060530 A1 | 5/2002 | Sembhi et al. |
| 2002/0067284 A1 | 6/2002 | Chamberlain et al. |
| 2002/0074559 A1 | 6/2002 | Downling et al. |
| 2002/0091653 A1 | 7/2002 | Peevey |
| 2002/0101184 A1 | 8/2002 | Chinsky et al. |
| 2002/0130627 A1 | 9/2002 | Morgan et al. |
| 2002/0143482 A1 | 10/2002 | Karanam et al. |
| 2002/0152045 A1 | 10/2002 | Dowling et al. |
| 2002/0154025 A1 | 10/2002 | Ling |
| 2002/0161556 A1 | 10/2002 | Williams et al. |
| 2002/0176396 A1 | 11/2002 | Hammel et al. |
| 2002/0178047 A1 | 11/2002 | Or et al. |
| 2002/0181427 A1 | 12/2002 | Sparr et al. |
| 2002/0193969 A1 | 12/2002 | Frantz et al. |
| 2003/0020595 A1 | 1/2003 | Wacyk |
| 2003/0057884 A1 | 3/2003 | Dowling et al. |
| 2003/0061159 A1 | 3/2003 | Adams et al. |
| 2003/0076281 A1 | 4/2003 | Morgan et al. |
| 2003/0076417 A1 | 4/2003 | Thomas et al. |
| 2003/0085749 A1 | 5/2003 | Xu et al. |
| 2003/0101108 A1 | 5/2003 | Botham et al. |
| 2003/0128134 A1 | 7/2003 | Fierro et al. |
| 2003/0137968 A1 | 7/2003 | Lareau et al. |
| 2003/0198188 A1 | 10/2003 | Castlebury et al. |
| 2003/0222587 A1 | 12/2003 | Dowling, Jr. et al. |
| 2004/0001442 A1 | 1/2004 | Rayment et al. |
| 2004/0032226 A1 | 2/2004 | Lys |
| 2004/0051467 A1 | 3/2004 | Balasubramaniam et al. |
| 2004/0051485 A1 | 3/2004 | Chansky et al. |
| 2004/0052076 A1 | 3/2004 | Mueller et al. |
| 2004/0062224 A1 | 4/2004 | Brownrigg et al. |
| 2004/0068549 A1 | 4/2004 | Motoyama |
| 2004/0099736 A1 | 5/2004 | Neumark |
| 2004/0119415 A1 | 6/2004 | Lansing et al. |
| 2004/0136194 A1 | 7/2004 | Disalvo |
| 2004/0138786 A1 | 7/2004 | Blackett et al. |
| 2004/0151129 A1 | 8/2004 | Kun-Szabo et al. |
| 2004/0162902 A1 | 8/2004 | Davis |
| 2004/0177032 A1 | 9/2004 | Bradley et al. |
| 2004/0178257 A1 | 9/2004 | Jeffrey |
| 2004/0181496 A1 | 9/2004 | Odinotski et al. |
| 2004/0212993 A1 | 10/2004 | Morgan et al. |
| 2004/0232856 A1 | 11/2004 | Huber |
| 2004/0248578 A1 | 12/2004 | Korpela et al. |
| 2004/0252643 A1 | 12/2004 | Joshi |
| 2005/0029955 A1 | 2/2005 | Blake |
| 2005/0035717 A1 | 2/2005 | Adamson et al. |
| 2005/0035720 A1 | 2/2005 | Blake |
| 2005/0041161 A1 | 2/2005 | Dowling et al. |
| 2005/0047134 A1 | 3/2005 | Mueller et al. |
| 2005/0054292 A1 | 3/2005 | Janusz et al. |
| 2005/0067982 A1 | 3/2005 | Pilz |
| 2005/0076034 A1 | 4/2005 | Addonisio et al. |
| 2005/0094493 A1 | 5/2005 | Walko, Jr. |
| 2005/0102040 A1 | 5/2005 | Kruse et al. |
| 2005/0124346 A1 | 6/2005 | Corbett et al. |
| 2005/0128666 A1 | 6/2005 | Pogodayev et al. |
| 2005/0136834 A1 | 6/2005 | Bonta et al. |
| 2005/0145688 A1 | 7/2005 | Milenkovic et al. |
| 2005/0146284 A1 | 7/2005 | Honma et al. |
| 2005/0146288 A1 | 7/2005 | Johnson et al. |
| 2005/0149345 A1 | 7/2005 | Daily |
| 2005/0161511 A1 | 7/2005 | Parker et al. |
| 2005/0163101 A1 | 7/2005 | Ashwood Smith et al. |
| 2005/0163144 A1 | 7/2005 | Srikrishna et al. |
| 2005/0164630 A1 | 7/2005 | Kates |
| 2005/0184671 A1 | 8/2005 | Williams et al. |
| 2005/0207159 A1 | 9/2005 | Maxik |

| | | |
|---|---|---|
| 2005/0213350 A1 | 9/2005 | Tsuda et al. |
| 2005/0225441 A1 | 10/2005 | Kerman |
| 2005/0232289 A1 | 10/2005 | Walko, Jr. et al. |
| 2005/0236998 A1 | 10/2005 | Mueller et al. |
| 2005/0242181 A1 | 11/2005 | Cunningham et al. |
| 2005/0248300 A1 | 11/2005 | Walko, Jr. et al. |
| 2005/0249215 A1 | 11/2005 | Kelsey et al. |
| 2005/0259647 A1 | 11/2005 | Wakumoto et al. |
| 2005/0271006 A1 | 12/2005 | Chari et al. |
| 2005/0275532 A1 | 12/2005 | Ferri et al. |
| 2005/0276233 A1 | 12/2005 | Shepard et al. |
| 2005/0277443 A1 | 12/2005 | Ozluturk |
| 2005/0280555 A1 | 12/2005 | Warner, IV |
| 2005/0282494 A1 | 12/2005 | Kossi et al. |
| 2005/0286426 A1 | 12/2005 | Padhye et al. |
| 2006/0002368 A1 | 1/2006 | Budampati et al. |
| 2006/0020498 A1 | 1/2006 | Aitipamula et al. |
| 2006/0038672 A1 | 2/2006 | Schoettle |
| 2006/0044152 A1 | 3/2006 | Wang |
| 2006/0049935 A1 | 3/2006 | Giannopoulas et al. |
| 2006/0058925 A1 | 3/2006 | Diederiks et al. |
| 2006/0071605 A1 | 4/2006 | Diederiks |
| 2006/0108950 A1 | 5/2006 | Chansky et al. |
| 2006/0125426 A1 | 6/2006 | Veskovic et al. |
| 2006/0144920 A1 | 7/2006 | Fang et al. |
| 2006/0202851 A1 | 9/2006 | Cash et al. |
| 2006/0235611 A1 | 10/2006 | Deaton et al. |
| 2006/0242200 A1 | 10/2006 | Horowitz et al. |
| 2006/0244395 A1 | 11/2006 | Taipale et al. |
| 2006/0244631 A1 | 11/2006 | Zigdon et al. |
| 2006/0273970 A1 | 12/2006 | Mosebrook et al. |
| 2006/0279236 A1 | 12/2006 | Johnson et al. |
| 2006/0284734 A1 | 12/2006 | Newman, Jr. |
| 2007/0013489 A1 | 1/2007 | Bechtle et al. |
| 2007/0018783 A1 | 1/2007 | Erhardt |
| 2007/0029949 A1 | 2/2007 | Null et al. |
| 2007/0043540 A1 | 2/2007 | Cleland et al. |
| 2007/0046489 A1 | 3/2007 | Fair et al. |
| 2007/0049242 A1 | 3/2007 | Fair et al. |
| 2007/0057807 A1 | 3/2007 | Walters et al. |
| 2007/0061020 A1 | 3/2007 | Bovee et al. |
| 2007/0063866 A1 | 3/2007 | Webb |
| 2007/0085699 A1 | 4/2007 | Walters et al. |
| 2007/0085701 A1 | 4/2007 | Walters et al. |
| 2007/0085702 A1 | 4/2007 | Walters et al. |
| 2007/0086912 A1 | 4/2007 | Dowling et al. |
| 2007/0091623 A1 | 4/2007 | Walters et al. |
| 2007/0103324 A1 | 5/2007 | Kosuge et al. |
| 2007/0109142 A1 | 5/2007 | McCollough, Jr. |
| 2007/0121323 A1 | 5/2007 | Pawlik et al. |
| 2007/0124074 A1 | 5/2007 | Katoh et al. |
| 2007/0124077 A1 | 5/2007 | Hedlund, Jr. |
| 2007/0126368 A1 | 6/2007 | McDonough et al. |
| 2007/0146126 A1 | 6/2007 | Wang |
| 2007/0194722 A1 | 8/2007 | Bruekers et al. |
| 2007/0195526 A1 | 8/2007 | Dowling et al. |
| 2007/0230159 A1 | 10/2007 | Cortenraad et al. |

FOREIGN PATENT DOCUMENTS

| | | |
|---|---|---|
| CN | 1596053 A | 3/2005 |
| CN | 1571618 A | 1/2006 |
| EP | 0586322 A1 | 3/1994 |
| EP | 0880308 A2 | 11/1998 |
| EP | 1239704 A1 | 9/2002 |
| EP | 1241924 A2 | 9/2002 |
| EP | 1339155 A2 | 8/2003 |
| EP | 1742321 A1 | 1/2007 |
| ES | 2116211 A1 | 7/1998 |
| FR | 2710205 A1 | 3/1995 |
| FR | 2601485 A1 | 1/1998 |
| FR | 2815744 A1 | 4/2002 |
| GB | 2368905 A | 5/2002 |
| GB | 2372160 A | 8/2002 |
| GB | 2403357 A | 12/2004 |
| JP | 11283760 A | 10/1999 |
| KR | 1020050003165 | 1/2005 |
| WO | WO 9620369 A1 | 7/1996 |
| WO | 9734272 A1 | 9/1997 |
| WO | 0076034 A1 | 12/2000 |
| WO | WO 0076034 A1 | 12/2000 |
| WO | WO 0211098 A2 | 2/2002 |
| WO | WO 03034570 A2 | 4/2003 |

OTHER PUBLICATIONS

Search Report for European Patent No. 06814424 dated Oct. 12, 2010.
BelAir200: Wireless Multi-service Switch Router For Hot Zone and Metro Wi-Fi Applications, BelAir Networks Brochure, 4 pages, Downloaded Nov. 2005.
Ezendam, G.J.M. Nedap News Release: Net profits increase to 6.3 million during the first six months of 2007, from http://www.nedap/com/en/news.php?id=58, 5 pages, 2006.
Garris, L.B., "DALI Explained: Deciphering the DALI Hype," from http://www.buildings.com/functions/print_article.
aspx?contentID=1463, 5 pages, Aug. 2003.
UtiliNet Series 3000 WanGate Radios: Spread Spectrum Mesh Radios, Cellnet, 2 pages, Downloaded Nov. 2005.
Pickberry Vineyard: Accenture Prototype Helps Improve Crop Management, from www.accenture.com, 2 pages, Copyright 1996-2005.
Products, from www.telemics.com/products_valueproposition.php, 1 page, printed Nov. 21, 2005.
Solution Brief: Wireless Mesh Network, Nortel Networks Brochure, 6 pages, Copyright 2005.
StreetSmarts™: Remote monitoring and control of street lights, GE Lighting Systems Brochure, 8 pages, Copyright 2003.
Technology, from www.telemics.com/technology.php, 1 page, printed Nov. 21, 2005.
Verics™ AccessPoint Data Sheet, Telemics, 1 page, Apr. 2004.
Verics™ CheckPoint Data Sheet, Telemics, 1 page, Apr. 2004.

* cited by examiner

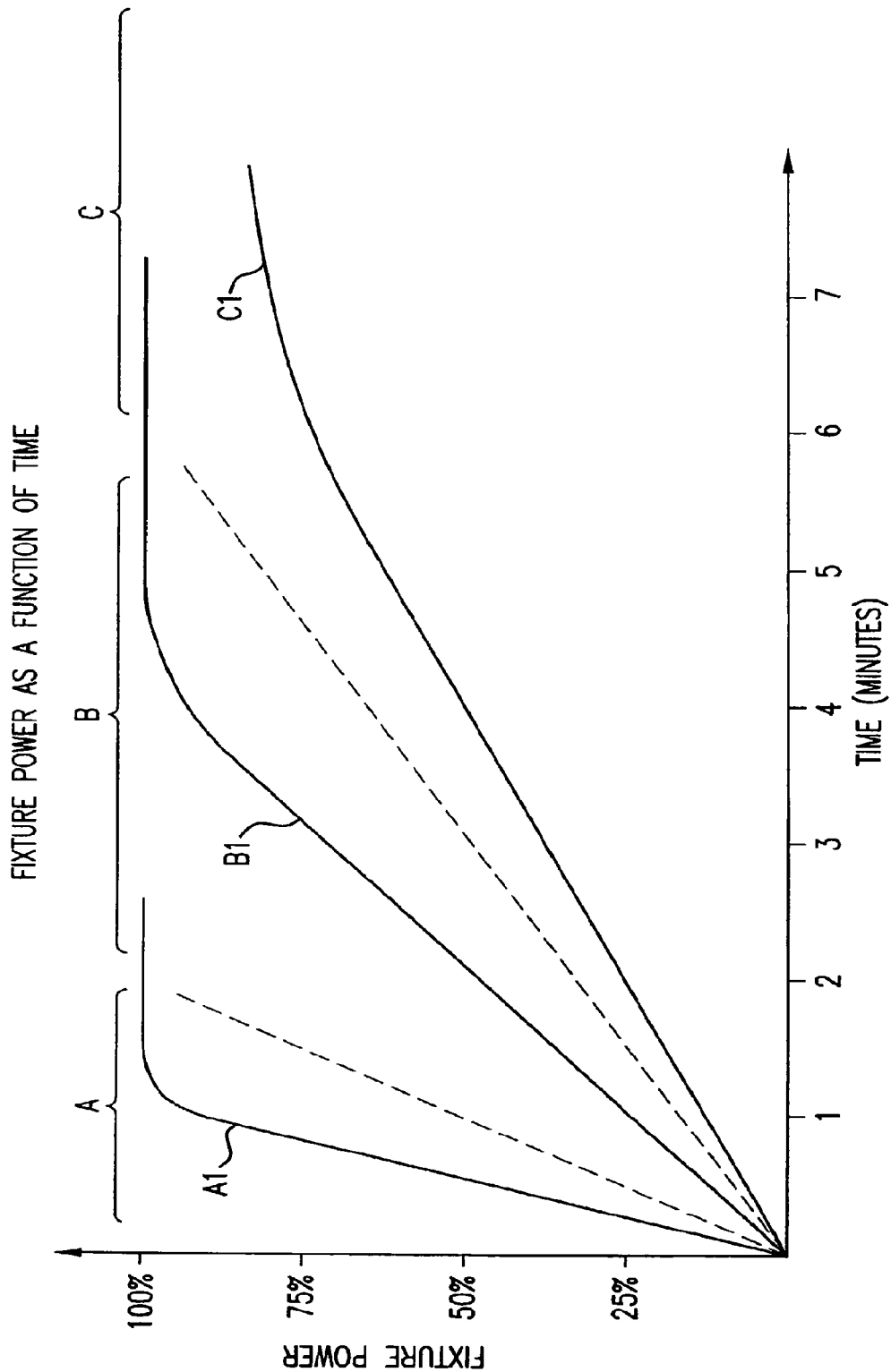

LIGHT MANAGEMENT SYSTEM HAVING NETWORKED INTELLIGENT LUMINAIRE MANAGERS

CROSS REFERENCE TO RELATED APPLICATIONS

This application is a continuation of U.S. patent application Ser. No. 12/028,597, filed on Feb. 8, 2008, which itself is a continuation of U.S. patent application Ser. No. 11/518,495, filed Sep. 11, 2006, entitled "Light Management System Having Networked Intelligent Luminaire Managers with Enhanced Diagnostics Capabilities," which issued as U.S. Pat. No. 7,333,903, which claims the benefit of U.S. Provisional Patent Application No. 60/715,584, filed on Sep. 12, 2005, each of which is incorporated herein by reference in its entirety.

This application is related to the following commonly owned patent applications: (1) U.S. patent application Ser. No. 11/518,497, filed Sep. 11, 2006, entitled "Light Management System Having Networked Intelligent Luminaire Managers", which issued as U.S. Pat. No. 7,603,184; (2) U.S. patent application Ser. No. 11/518,496, filed Sep. 11, 2006, entitled "Light Management System Having Networked Intelligent Luminaire Managers That Support Third-Party Applications", which issued as U.S. Pat. No. 7,911,359; (3) U.S. patent application Ser. No. 11/518,488, filed Sep. 11, 2006, entitled "Network Operation Center For A Light Management System Having Networked Intelligent Luminaire Managers", which issued as U.S. Pat. No. 7,546,167; (4) U.S. patent application Ser. No. 11/518,494, filed Sep. 11, 2006, entitled "Owner/Operator Control Of A Light Management System Using Networked Intelligent Luminaire Managers", which issued as U.S. Pat. No. 7,546,168; and (5) U.S. patent application Ser. No. 11/518,511, filed Sep. 11, 2006, entitled "Activation Device For An Intelligent Luminaire Manager", which issued as U.S. Pat. No. 7,529,594; each of which is incorporated herein by reference in its entirety.

FIELD OF THE INVENTION

The present invention generally relates to light system management. More particularly, it relates to controlling and managing outdoor lighting units using a light management system having networked intelligent luminaire managers, and applications thereof.

BACKGROUND OF THE INVENTION

It is estimated that there are more than 60 million outdoor lights in the United States autonomously controlled by conventional photo-controls. These outdoor lights, when properly working, simply react to ambient light conditions, for example, to turn-on at dusk and turn-off at dawn. This method of operating outdoor lights results in many lights being on when they are not needed, and it significantly increases outdoor lighting system operating costs.

The use of conventional photo-controls to control outdoor lights (luminaires) also leads to maintenance and repair issues. There are significant costs associated with hiring qualified maintenance personnel and buying equipment such as, for example, special maintenance vehicles required to access light fixtures for replacing lamps and servicing electrical components. To discover faulty fixture operations, light system owners and operators must resort to sending maintenance personnel to do "drive-by" visual examination of all units, which often number in the thousands or wait for a customer to report a malfunction. This drive-by must be done at night to detect non-functioning fixtures. These high costs limit how many lights can be repaired or serviced on any given day and force many light system operators to maintain their outdoor lights on an as needed basis (i.e., only when they are notified of an inoperable light). Understandably, this maintenance methodology is highly inefficient because it ties up resources as crews and equipment randomly travel to failed, geographically dispersed outdoor lights.

Lighting system operators (e.g., electric utilities) have tried to limit the time, equipment, and personnel spent on any given outdoor light by conducting group maintenance programs, where lights within a given geographical area are maintained on a scheduled basis. This approach reduces travel time between lights. In order to implement this maintenance methodology, light system operators must estimate lighting equipment life expectancy and schedule maintenance in each geographical area when lighting outages in the area are expected to reach a predetermined level. While this methodology has certain benefits, maintenance crews often replace good equipment that has significant additional life remaining Consequently, this maintenance methodology results in maintenance crews throwing away good equipment and visiting outdoor lights that do not require maintenance. Locating light fixtures with failed lamps is a problem since roadway fixtures are only on at night and most maintenance crews work during the day.

What is needed is a new light management system that overcomes the deficiencies noted above.

BRIEF SUMMARY OF THE INVENTION

The present invention provides a light management system having networked intelligent luminaire managers, and applications thereof. In an embodiment, a plurality of networked luminaire managers, each collocated with a respective luminaire, monitor the status of their respective luminaires. Each luminaire manager includes a transmitter for transmitting status information about its respective luminaire such as, for example, a lamp out condition upon occurrence of such a lamp out condition, to a network server. The network server forwards the received status information from the networked luminaire managers to a computer of a light system owner/operator. The luminaire managers communicate with each other, whereby they form a network.

Features and advantages of the present invention, as well as the structure and operation of various embodiments of the present invention, are described in detail below with reference to the accompanying drawings.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable persons skilled in the pertinent arts to make and use the invention.

In the drawings, like reference numbers indicate identical or functionally similar elements. Additionally, the left-most digit of the reference number indicates a drawing in which the reference number first appears.

FIG. 3I is a graph illustrating fixture power as a function of time during startup of a gas discharge lamp.

DETAILED DESCRIPTION OF THE INVENTION

The present invention provides a light management system having networked, intelligent luminaire managers, and applications thereof. In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
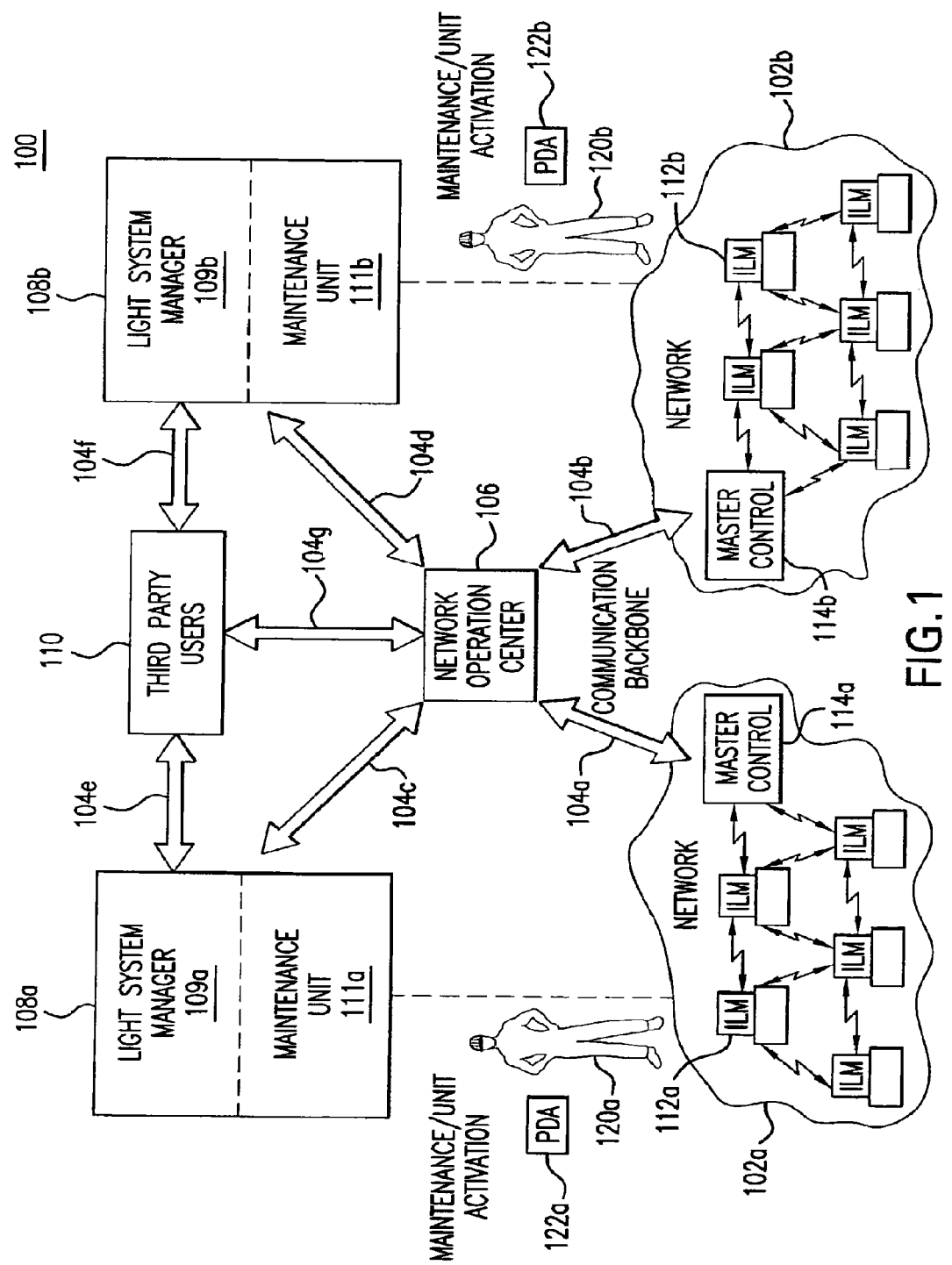
FIG. 1 is a diagram illustrating a light management system according to an embodiment of the present invention.

FIG. 1 illustrates a light management system 100 having networked intelligent luminaire managers 112 according to an embodiment of the present invention. As illustrated in FIG. 1, light management system 100 includes networks 102a and 102b, a network operation center 106, light system owner/operators 108a and 108b, and third-party users 110. These subsystems of system 100 are linked together using appropriate communication means such as, for example, radio frequency communications, optical communications and/or power line carrier to form communications backbone 104.

Each of the networks 102a and 102b includes several intelligent luminaire managers (ILMs) 112 and a master control 114. The intelligent luminaire managers 112 communicate with each other and with master controller 114 using, for example, short-range radio frequency (RF) communication links. In an embodiment, these RF communication links operate in the 900 MHz unlicensed band and have a range of about 1000 feet. As described further below with reference to FIGS. 2 and 3, each of the intelligent luminaire managers 112 controls operation of a light fixture, also called a luminaire.

Networks 102a and 102b in FIG. 1 each monitor and control operation of an outdoor light system or subsystem. These outdoor light systems are represented as being operated and maintained by light system owner/operators 108a and 108b respectively. Accordingly, data collected by intelligent luminaire managers 112 regarding the status of the light system represented by network 102a is forwarded to owner/operator 108a. Data collected by intelligent luminaire managers 112 regarding the status of the light system represented by network 102b is forwarded to owner/operator 108b. Owner/operators 108a and 108b also have the capability to send commands to and/or reprogram operation of the intelligent luminaire managers coupled to their lights using the data network shown in FIG. 1. This allows owner/operators 108a and 108b to adjust the operation of their respective light system.

In preferred embodiments of the present invention, networks 102 are peer-to-peer networks and/or mesh networks. These networks support three levels of devices: master controllers 114; network routing devices, for example, intelligent luminaire manager 112; and other nodes such as RF device 202 (see FIG. 2).

Each of the network links between intelligent luminaire managers 112 includes a two-way communication channel. These two-way communication channels between intelligent luminaire managers 112 support, for example, over the air or power-line carrier re-keying and re-programming of these intelligent control device. This allows for on-demand, turn-on and turn-off, for example, of selected street lights coupled to intelligent luminaire managers 112.

In an embodiment, each intelligent luminaire manager 112 maintains an internal clock which is synchronized throughout the entire network. The clock may be local to the device or maintained at a selected location and transmitted to each luminaire manager 112. This permits accurate date/time stamps to be added to data sent to network operations center 106 and for time-based control of intelligent luminaire managers 112.

In embodiments of the present invention, intelligent luminaire managers 112 support commands sent from master controller 114 to alternate routing paths. Additionally, intelligent luminaire managers 112 will automatically attempt to reconnect to network 102 if a signal is lost for more than a selected period of time (e.g., after 15 minutes, after 30 minutes, after 60 minutes, etc.). Each intelligent luminaire manager 112 is capable of rerouting data through an alternative path, should one or more of the intelligent luminaire managers 112 fail. When a failed or new intelligent network controller 112 reenters network 102, other devices within the network pass on the activation or installation of the new intelligent luminaire manager to other network routing devices.

Additional details about the operation of intelligent luminaire managers 112 are described below.

Master controllers 114a and 114b serve as gateways between their associated intelligent luminaire managers 112 and network operation center 106. Each master controller 114 is coupled to network operation center 106 through a communication backbone channel 104. In embodiments, communication backbone channels 104 can be, for example, electrical and/or optical land line communication channels, satellite communication channels, paging network channels, power line carrier channels, RF links and/or cellular communication channels. These communication channels can include public and/or private communication means (e.g., utility owned lines and/or the Internet).

In one embodiment, network operation center 106 couples to master controllers 114 via an internet protocol infrastructure provided by third party carrier network services. Master controllers 114 preferably provide data concentration and compression, and thereby reduce the overall service fees for third party leasing arrangements of communication services. Master controllers 114 also preferably include a data storage capability so that data to and from intelligent luminaire managers 112 can be stored during network communication disruptions and transmitted after communications are restored.

In an embodiment, each master controller 114 connects with network operation center 106 at predetermined times and uploads the current status of all intelligent luminaire managers 112 within its area of responsibility and any devices that have entered network 102 since its last update to network operations center 106. For high-priority communications, such as, for example, detection of a failed lamp, master controller 114 may make unscheduled communications to network operation center 106.

Preferably, each master controller 114 is responsible for linking several intelligent luminaire managers 112 to network operation center 106. For example, in one embodiment, more than 500 intelligent luminaire managers may be linked by a single master controller 114 to network operation center 106. It is a feature of each master controller 114 that it can be programmed from network operation center 106.

In certain embodiments, master controller 114 is capable of inheriting the features of network 102 routing devices, such as intelligent luminaire manager 112, for communications within network 102. Master controller 114 also can implement, for example, a TCP/IP stack for communications over communication backbone channel 104 with network operation center 106. Master controller 114 preferably includes memory such as card slot non-volatile storage or compact flash memory and caches data representing the status of all intelligent luminaire managers 112 for which it is responsible.

As described in more detail below, in embodiments, master controller 114 provides authentication and authorization to radio frequency devices wanting to enter network 102. Master controller 114 communications with intelligent luminaire managers 112 and optimizes routing within its network cluster. Master controller 114 also preferably includes a backup energy source sufficient to power master controller 114, for example, for up to 24 hours of operation.

Network operation center 106 provides a variety of services for light system owner/operators 108. These services include, for example, 24-hour-a-day, seven-day-a-week data storage and forwarding services for data flowing between light system owner/operators 108 and their respective intelligent luminaire managers 112. Network operation center 106 is preferably responsible for configuring, monitoring, and operating the router switches and other communication equipment that comprise the data network illustrated by FIG. 1. In an embodiment, network operation center 106 manages and allocates internet protocol addresses and domain names for the data network, manages and allocates nodes for the data network, provides database management services, network security management, and other network services.

As illustrated in FIG. 1, network operation center 106 interfaces with a plurality of light system owner/operators 108 and/or other appropriate entities. Each light system owner/operator is shown comprising a light system manager 109 and a maintenance unit 111. Maintenance personnel 120 from the maintenance units are responsible for repairing, replacing and maintaining their own respective light systems. Maintenance personnel 120 may also be responsible for initial installation and activation of their intelligent luminaire managers 112 with the aid of a wireless device such as a personal data assistant (PDA) hosted, intelligent luminaire manager field unit 122, or another microprocessor based device. This field unit is described in more detail below with reference to FIGS. 5A and 5B.

In operation, system 100 performs as illustrated by the following example cycle of events. An owner/operator 108 of an outdoor light system wishes to reduce operation and maintenance costs associated with his or her light system. The owner/operator 108 therefore has maintenance personnel 120 install and activate intelligent luminaire managers 112 according to the present invention on each of the lights of the light system, for example, as the conventional photo-controls are replaced due to failures. A master controller 114 is also installed in the vicinity of one of the intelligent luminaire managers (e.g., on a nearby pole or building rooftop).

During the installation and activation of each intelligent luminaire manager, selected information such as the intelligent luminaire manager's identification number, GPS grid coordinates for the location of the installation, the type of light equipment being controlled, a digital photo of the installation, and/or initial equipment parameters is collected by maintenance personnel 120 with the aid of the PDA hosted field unit 122. This information is then stored in the owner/operator's maintenance system records. In embodiments, the PDA hosted field unit 122 can communicate with intelligent luminaire managers 112 as well as master controllers 114 to receive information and/or upload information.

Using the services of network operation center 106 and a computer connected to network operation system 106 (e.g., via a secure Internet link), owner/operator 108 is able to monitor and control his or her lights. For example, if a light fails or is determined to be degraded, the intelligent luminaire manager 112 coupled to the light sends an alarm to owner/operator 108, indicating that a failure has occurred or is likely to occur, via the network and network operation center 106. This alarm notifies light system owner/operator 108 of the changed light system status and allows owner/operator 108 to take appropriate action.

In one embodiment, the alarm interacts automatically with the owner/operator's maintenance program and generates a work order that tells maintenance personnel 120 what actions are needed. The work order might include, for example, the time of the alarm, the location of the degraded or failed equipment, and what equipment or parts are needed to correct the problem that caused the alarm. This work order is downloaded into the PDA-hosted intelligent luminaire manager field unit and used to guide maintenance personnel 120 to the site of the degraded or failed equipment. Once the repairs to the light are made, intelligent luminaire manager 112 updates the status for the light and the alarm is cleared. In an alternative embodiment, the alarm is cleared only when owner/ operator 108 updates his or her maintenance records, for example, using data collected by the intelligent luminaire manager field unit 122 while the repair was being performed. In another embodiment, failure is only reported to owner/operator 108 when the failure has occurred a specified number of days in a row.

Once owner/operator 108 has installed intelligent luminaire managers on his or her lights, owner operator 108 can control when the lights are turned-on and turned-off. This is achieved by sending commands over the data network to individual or assignable groups of intelligent luminaire managers 112 and/or reprogramming a control program stored in a memory of each intelligent luminaire manager or group of assignable intelligent luminaire managers. More details regarding the functionality of intelligent luminaire managers 112 is provided below.

Also shown in FIG. 1 are third-party users 110. Third-party users 110 are managers/users of system 100 other than light system owner/operators 108 and network operation center 106 personnel. For example, a third party user 110 may be someone hired by an owner/operator 108 to operate his or her light system or someone who is leasing, or otherwise appropriately using, bandwidth in system 100 as explained in more detail below with reference to FIG. 2.

Figure 2:
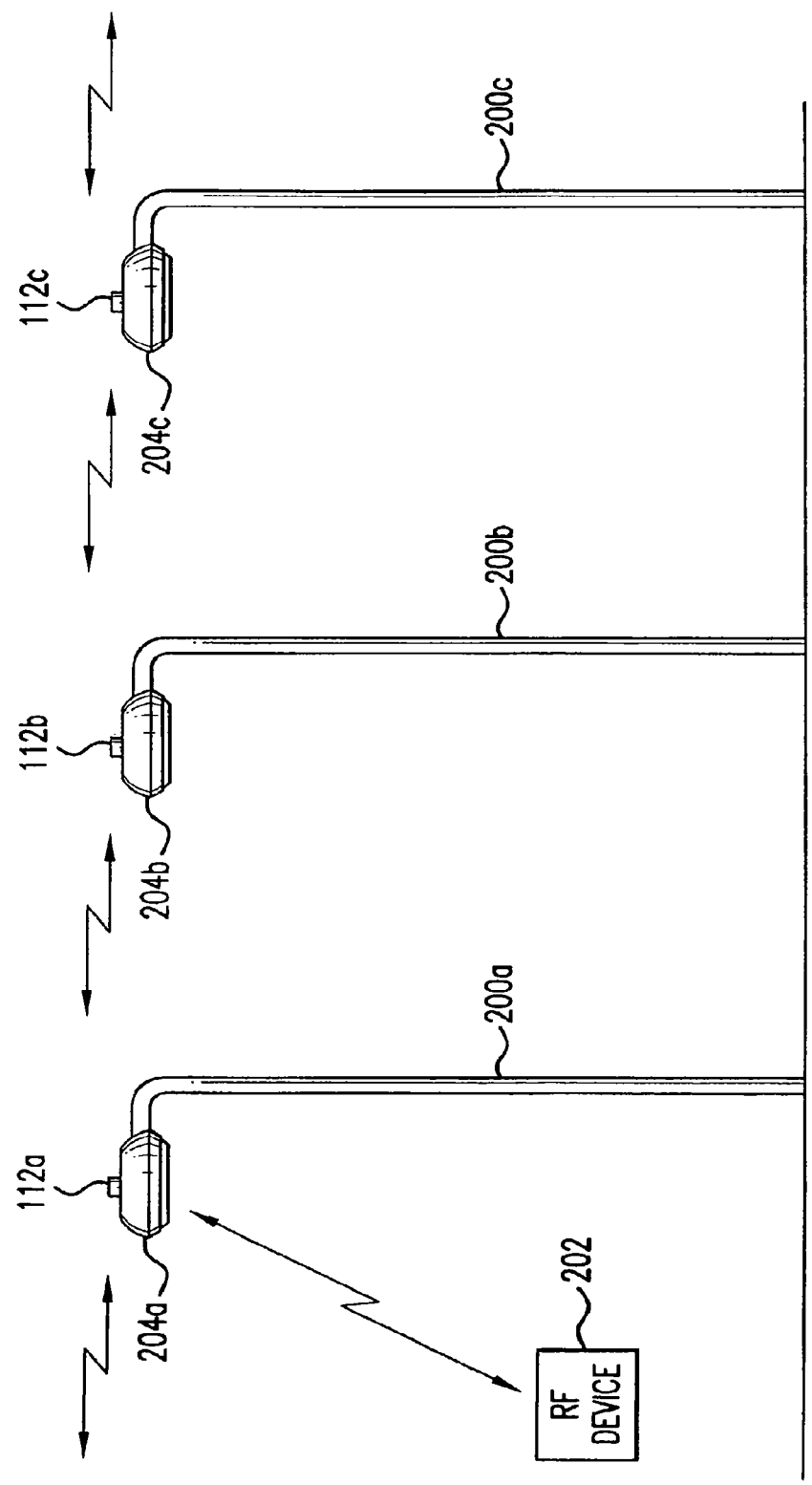
FIG. 2 is a diagram illustrating street lights networked together using intelligent luminaire managers according to an embodiment of the present invention.

FIG. 2 illustrates a plurality of street lights 200 that form part of a light system operated and maintained by an owner/operator 108. Each street light 200 is equipped with an intelligent luminaire manager 112 mounted, for example, on top of a light fixture 204 of street lamp 200. In the embodiment shown, intelligent luminaire manager 112 is preferably configured and housed in an enclosure that conforms to appropriate NEMA and ANSI standards so that it can be exchanged one-for-one with a prior-existing photo-control used to control light fixture 204. This compatibility allows intelligent luminaire manager 112 to be installed on a light fixture 204 without requiring a new mount and without requiring any rewiring or physical modification of the fixture. Persons skilled in the relevant arts are familiar with industry standards such as NEMA and ANSI C136 standards, and they will understand, based on the disclosure herein, how to adapt intelligent luminaire manager 112 for selected applications and customers.

As shown in FIG. 2, an intelligent luminaire manager 112 communicates using an RF communication link with its neighbors mounted on neighboring street lights 200. In an embodiment, an intelligent luminaire manager 112 also is capable of communicating with other nearby devices that include, for example, an RF device 202. This communication can be unidirectional or bidirectional. The unidirectional communication can be from RF device 202 to intelligent luminaire manager 112 or from intelligent luminaire manager 112 to RF device 202 depending on whether RF device 202 is a transmitting device or a receiving device. Communication with an RF device 202 is established when an RF device 202 enters into the communication space of an intelligent luminaire manager 112 and is authorized to become a part of the network formed by intelligent luminaire manager 112 and its neighbors.

In one embodiment, RF device 202 may become a part of a network by transmitting a signal that is received by a communications unit inside intelligent luminaire manager 112. Intelligent luminaire manager 112 then reports the presence of RF device 202 to network operation center 106, via the network and a master control 114. RF device 202 may be allowed to simply transmit data over the network, or it may be allowed to transmit and receive data. This communication can be either open or encrypted. Intelligent luminaire manager 112 is able to block communications from RF device 202 if RF device 202 is assessed to be functioning improperly or if the RF device's access is denied based on a blacklist maintained by the network operations center or if the RF device is interfering with the routing of higher priority traffic.

In embodiments of the present invention, RF device 202 is referred to as a blind slave. A blind slave is a device controlled by intelligent luminaire manager 112. One example use of a blind slave is to control the operation of an outdoor light (e.g., a house porch light or a driveway light). The blind slave coupled to the light receives commands from a nearby intelligent luminaire manager 112 to turn-on and turn-off the light, for example, in conjunction with the luminaire controlled by the intelligent luminaire manager 112. In one embodiment, blind slaves may be controlled by a utility in order to limit power usage during periods of high power demand and thereby prevent brown-outs or black-outs from occurring. The use of blind slaves is not limited to just photo control.

In embodiments of the present invention, the communication links between intelligent luminaire managers 112 can include, for example, power line carrier communication links or optical communication links. Thus, the present invention is not limited to using only RF communication links.

As described further below with reference to FIG. 6, the precise location of each intelligent luminaire manager device 112 is known. Therefore, using appropriate algorithms, intelligent luminaire manager 112, master controller 114 and/or network operation center 106 are able to accurately determine and report the location of any RF device 202. For example, in an embodiment of the present invention, master controller 114 is able to calculate interpolated coordinates for an RF device 202 based on information received from a variety of intelligent luminaire managers 112 and the master controller's knowledge of the locations of these luminaire managers 112.

As will be understood by persons skilled in the relevant arts, the potential for communicating with radio frequency (RF) or radio frequency identification (RFID) type devices using the network formed by intelligent luminaire managers 112 is nearly boundless and limited only by the bandwidth available. For example, an RF device 202 might be included in a car and used to monitor and locate stolen cars as they pass by or park near streetlights 200. An auto insurance company can pay a light system owner/operator to monitor for and report the location of stolen cars using his or her network. In this example, an RF device 202 might be configured to start transmitting a stolen car signal, for example, whenever the car's engine was started without using the car's ignition key. This stolen car signal would be detected by an intelligent luminaire manager 112 and reported via the network to an appropriate individual (e.g., a third party user 110 such as an insurance company representative and/or a local law enforcement official).

A similar use to that described above of the network capabilities of intelligent luminaire managers 112 would be to identify and locate an individual under house arrest, wearing an ankle bracelet, who has left his or her house. Other possible uses include, but are not limited to: providing security monitoring to determine if a nearby gate is open or closed or whether a particular system is on or off; to provide an interface to General Motor's ON-STAR system; to provide gun shot detection; to provide auto traffic and pedestrian monitoring; to provide public address audio communications and broadcast warning information (e.g., radiation alerts, bio alerts, chemical alerts, smog alerts, etc.); to provide high crime area surveillance; to locate lost individuals, children and pets; to relay weather monitoring data, power monitoring data, etc.; to repeat cellular communications, WiFi communications, or Internet communications; and to read and/or relay electric meter data, gas meter data, and/or water meter data for public utilities. Still other uses will become apparent to those skilled in the relevant arts given the description herein.

Figure 3A:
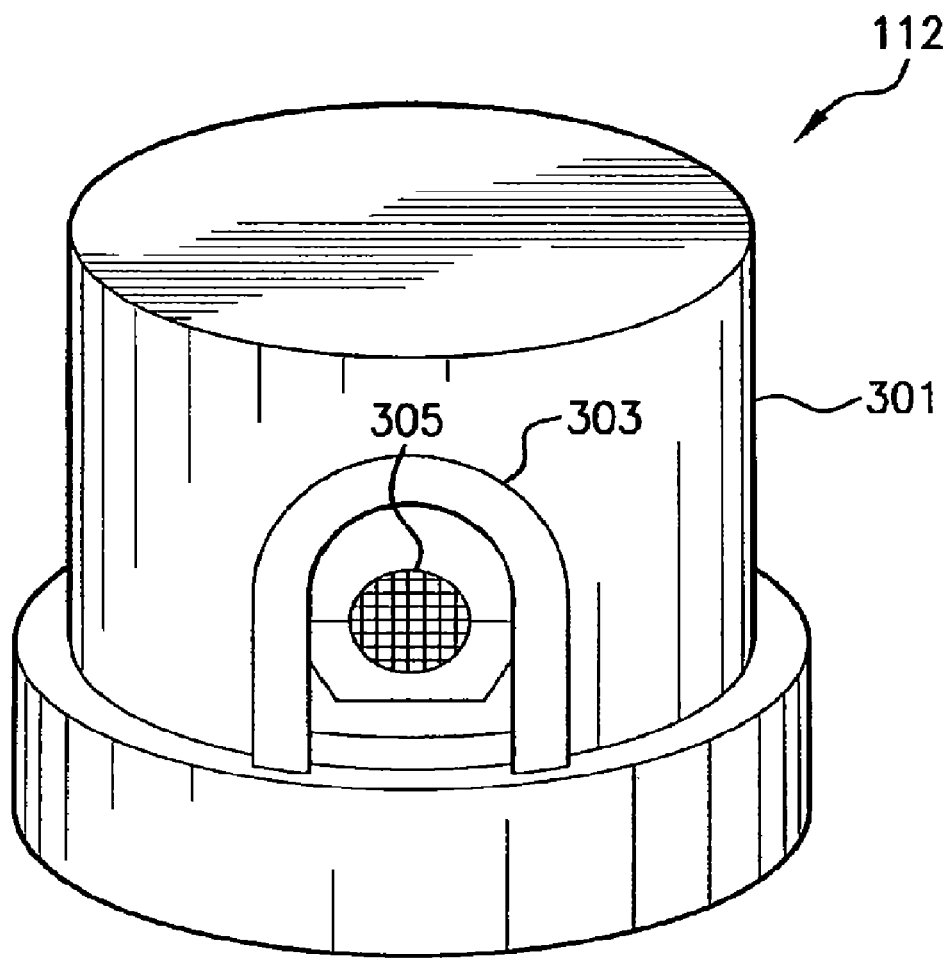
FIG. 3A is a diagram illustrating an intelligent luminaire manager according to an embodiment of the present invention.

FIG. 3A shows a detailed view of an enclosure 301 for intelligent luminaire manager 112 according to an embodiment of the invention. As shown in FIG. 3A, housing 301 of intelligent luminaire manager 112 includes a window 303 that exposes a photo-detector 305 to ambient light. This allows intelligent luminaire manager 112 to be programmed to turn-on and/or to turn-off based on ambient light conditions in addition to an internal clock. A filter can be used to adjust the sensitivity/response of photo-detector 305 (e.g., a filter such as an infrared filter can be used to prevent the unwanted turning-on and turning-off of a light due to passing clouds, sky condition or the influence of other nearby lights).

In an embodiment, intelligent luminaire manager 112 includes at least one LED (not shown) internal or external to enclosure 301 for communicating with maintenance crews. In one embodiment, the LED transmits infrared signals that are received by PDA hosted field unit 122. In another embodiment, the LED flashes a visual code that can be seen and interpreted by the maintenance crew. For example, when an intelligent luminaire manager is initially installed, it sends a message to a nearby intelligent luminaire manager 112 and receives back an acknowledgement signal. When this acknowledgment signal is received by the newly installed intelligent luminaire manager 112, its LED sends or flashes a code to let the maintenance crew know that the signal has been sent and an acknowledgement signal received. This lets the maintenance crew know that the intelligent luminaire manager 112 is working properly. In an embodiment, an LED signal may be different colors to indicate different status.

As noted above, enclosure 301 preferably conforms to appropriate NEMA and ANSI standards so that is can be installed on an intended light fixture without requiring a new mount and without requiring any rewiring or physical modification of the fixture. In embodiments, enclosure 301 is formed from a highly durable material, such as plastic, that is appropriate for outdoor use and that will withstand the expected weather and temperatures variations at the intended location of installation. Enclosure 301 also can be coated with a weather-resistant material.

In an embodiment, each luminaire manager 112 or enclosure 301 has a scannable barcode securely attached for purposes of identification. An identification code can also be stored in a memory of each luminaire manager 112. In an embodiment, PDA hosted field unit 122 is used to read and/or write the identification code to the memory of each luminaire manager 112.

Figure 3B:
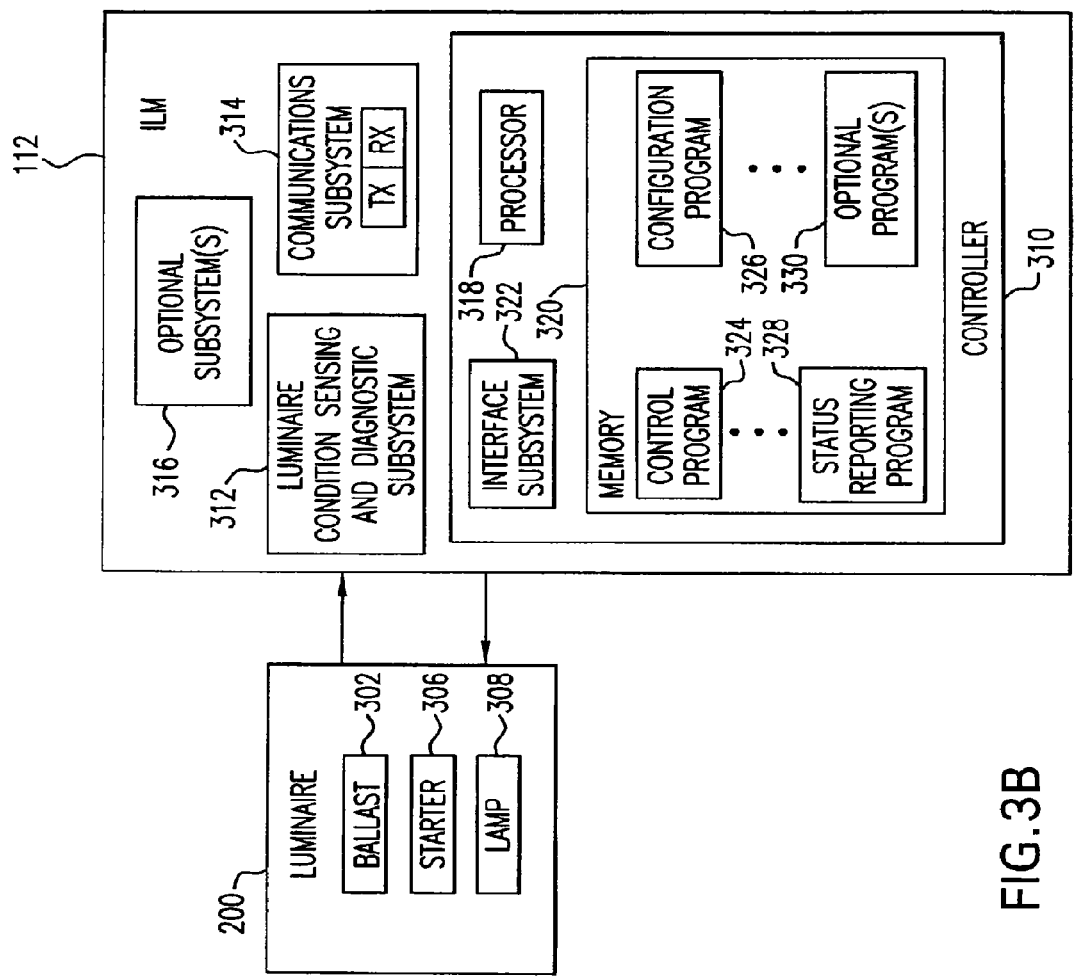
FIG. 3B is a block diagram illustrating a luminaire and the intelligent luminaire manager of FIG. 3A according to an embodiment of the present invention.

FIG. 3B is a block diagram that further illustrates the features and functionality of an intelligent luminaire manager 112 according to an embodiment of the present invention. As shown in FIG. 3B, intelligent luminaire manager 112 is coupled to and controls a light or more precisely a luminaire 200. Luminaire 200 includes a ballast 302, a starter 306, and a lamp 308. Intelligent luminaire manager 112 includes a controller 310, a luminaire condition sensing and diagnostic subsystem 312, a communications subsystem 314, and other optional subsystems 316.

In an embodiment, luminaire 200 is a conventional luminaire such as, for example, a street light. The purpose and function of ballast 302, starter 306, and lamp 308 are well-known to persons skilled in the relevant art.

Controller 310 includes a processor 318, memory 320, and an interface subsystem 322. Memory 320 stores a variety of programs that are executed and/or implemented using processor 318. These programs include, for example, a luminaire control program 324, luminaire and intelligent luminaire manager configuration program 326, status reporting program 328, and other optional programs 330.

As will become apparent to persons skilled in the relevant arts given the description herein, intelligent luminaire manager 112 is a novel and enhanced networking device that includes and improves upon the functionality and capabilities of the luminaire diagnostic system(s) described in U.S. Pat. Nos. 6,028,396, 6,452,339, and 6,841,944, each of which is incorporated herein by reference in its entirety. These improvements are described below.

One notable improvement is added functionality that allows intelligent luminaire manager 112 to be used to turn-on and turn-off lamp 308 on demand. Commands to turn-on and turn-off lamp 308 can be delivered to intelligent luminaire manager 112 via the data network illustrated in FIG. 1. In an embodiment, data sent by an owner/operator 108 over the network is used to program a luminaire control program 324 stored in memory 320 of intelligent luminaire manager 112. This program interacts with a network synchronized clock/timer function and supports an on-time and an off-time for lamp 308 for each day of the week with a one-minute time resolution. Example on-time and off-time commands that can be programmed include: (1) turn on lamp 308 at time X, and turn off lamp 308 at time Y; (2) turn on lamp 308 at time X, and turn off lamp 308 Y minutes after it is turned on; (3) turn on lamp 308 at dusk, and turn it off X minutes after it turns-on; and (4) turn on lamp 308 at dusk, and turn it off X minutes after dawn.

The above described programmable commands to turn-on and turn-off lamp 308 are illustrative only and not intended to limit the present invention. Other programmable commands that can be used will become apparent to persons skilled in the relevant arts given the description herein. For example, commands can be programmed to turn lamp 308 on only during certain days of the week, to turn-on and turn-off lamp 308 at different times during different days in a given week, or all lamps in a group can be turned-on at a specified time and turned-off, for example, at dawn. In one embodiment, selected lamps can be sent a command to turned-off during periods of high power demand. Likewise, turn-on and turn-off times can be programmed to meet state or local light trespass codes, and these can be re-programmed remotely if the light trespass codes change.

In one embodiment, in the event an intelligent luminaire manager 112 loses contact with network operations center 106 or master controller 114, due for example to a network failure, intelligent luminaire manager 112 will revert to a pre-stored program for controlling luminaire 200. For example, this could be to turn on lamp 308 at dusk and to turn it off at dawn. Intelligent luminaire manager 112 can tolerate and continue operating through expected energy surges and sags without disruption of operation.

In an embodiment, an intelligent luminaire manager 112 uses luminaire condition sensing and diagnostic subsystem 312 to monitor A/C power provided to luminaire 200. For example, luminaire condition sensing and diagnostic subsystem 312 monitors voltage sags and over voltage and records the time, severity, and duration of these events, and reports these events to owner/operator 108. Additionally, in an embodiment, luminaire condition sensing and diagnostic subsystem 312 records the current provided to start lamp 308 and the current drawn by lamp 308 at some period after it is lit.

Such data is useful, for example, for monitoring the proper operation of luminaire 200, and in particular ballast 302.

In one example embodiment, intelligent luminaire manager 112 monitors cycling of luminaire 200. It records, for example, fixture current after lamp 308 starts. If the fixture current increases or decreases more than a specified amount in a given time interval, this denotes one cycle. Cycle detections are reported to the master controller 114, via network messages, and forwarded to owner/operator 108. In one embodiment, an occurrence of multiple cycles such as, for example, about five in a given night may be reported as a defective lamp.

In an embodiment, intelligent network luminaire manager 112 generates a faulty lamp signal/alarm in the following manner. First, it measures lamp 308 power or volt amperes at two seconds after start, 15 seconds after start, one minute after start, and 8.5 minutes after start. If all four measurements are the same within, for example, about 10%, lamp 308 is flagged as faulty. Accordingly, a faulty lamp detection signal/alarm is stored and relayed to network operation center 106 and owner/operator 108.

As noted herein, values such as the 10% tolerance for current comparisons are reprogrammable. However, loss of network connectivity, for example, for more than a selected period of time causes intelligent luminaire manager 112 to revert programmable time measurement intervals and tolerances to default values stored within intelligent luminaire manager 112 memory.

Intelligent luminaire manager 112 is preferably capable of measuring true AC currents and voltages in addition to average currents and voltages. In embodiments, intelligent luminaire manager 112 determines and records the power consumption of an attached device as well as power factor and load.

As described above, status data collected by intelligent luminaire managers 112 is communicated via network 102 to master controller 114 and then to network operation center 106. At network operation center 106, the status data is analyzed for alarms and alerts, sorted, stored, and routed to an appropriate owner/operator 108.

Additional features and functionality of intelligent luminaire manager 112 are described below.

Figure 3C:
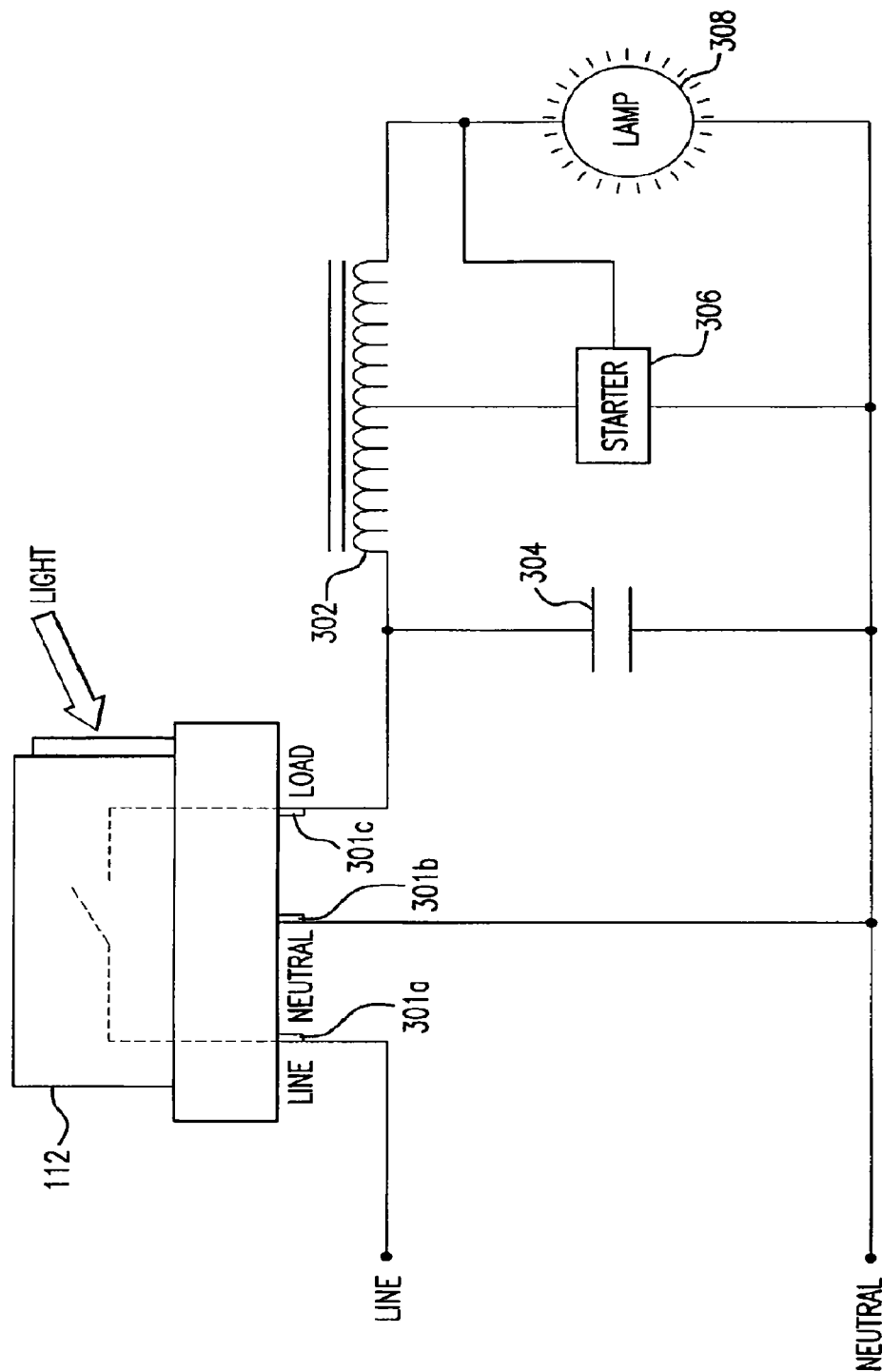
FIG. 3C is a circuit diagram illustrating a luminaire and the intelligent luminaire manager of FIG. 3A according to an embodiment of the present invention.

FIG. 3C is a circuit diagram that further illustrates luminaire 200 and intelligent luminaire manager 112 according to an embodiment of the present invention. The circuit diagram is illustrative and not intended to limit the present invention. As shown in FIG. 3C, in one embodiment, intelligent luminaire manager 112 is a three-prong device per ANSI C136.10 or similar standard that acts like a switch to control the power supplied to luminaire 200. A first prong 301a of intelligent luminaire manager 112 connects to an energized line of a power supply (not shown). A second prong 301b of intelligent luminaire manager 112 connects to a neutral line or common of the power supply. A third prong 301c of intelligent luminaire manager 112 connects to a load line of luminaire 200. The load line is attached to ballast 302 and an optional power factor correction capacitor 304. Ballast 302 is connected to starter 306 (if used) and lamp 308. Optional power factor correction capacitor 304, starter 306, and lamp 308 are each connected to the neutral line of the power supply.

Figure 3D:
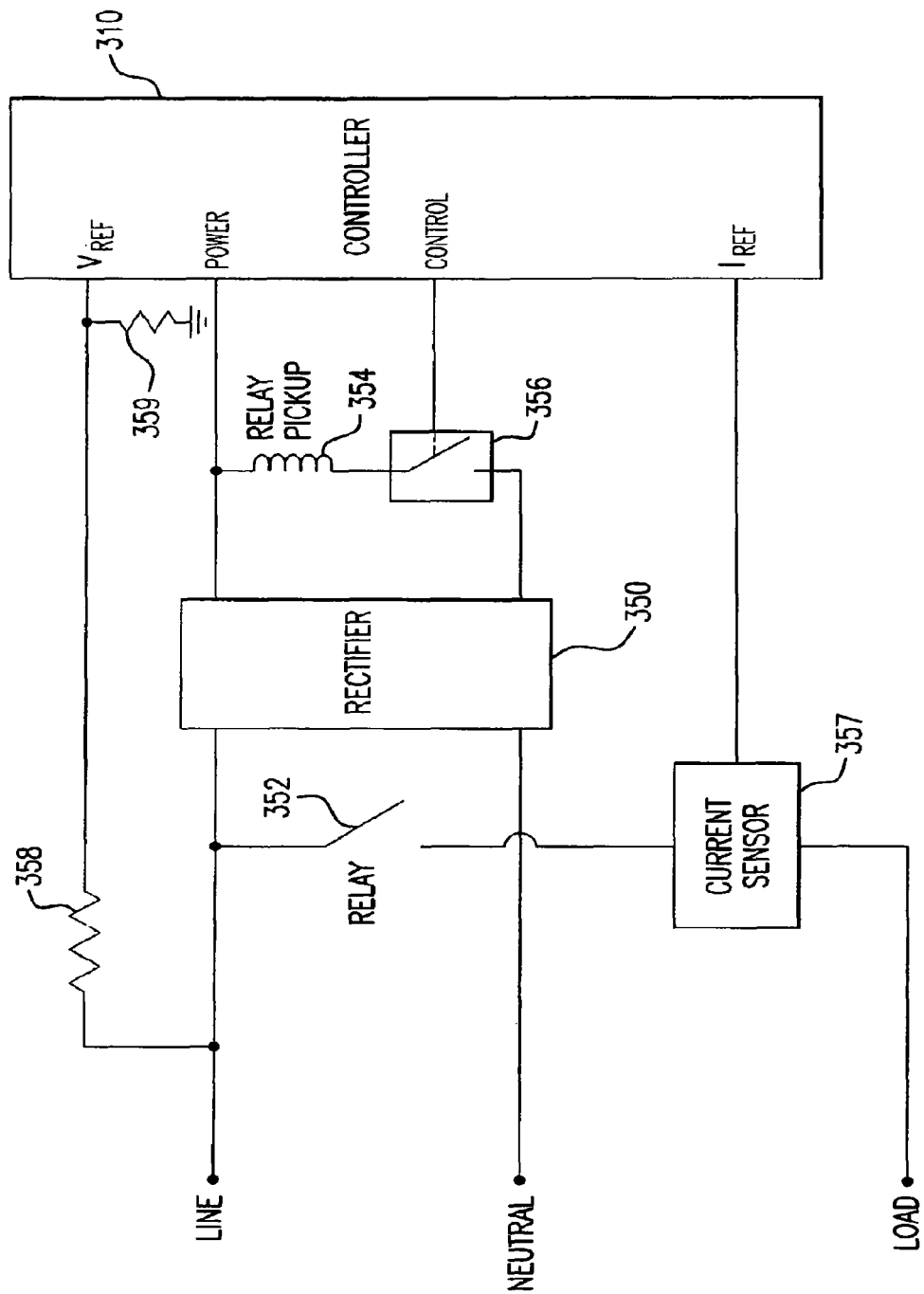
FIG. 3D is a circuit diagram further illustrating the intelligent luminaire manager of FIG. 3A according to an embodiment of the present invention.

FIG. 3D is a more detailed circuit diagram of an intelligent luminaire manager 112 according to an embodiment of the present invention. As shown in FIG. 3D, power from the power supply is rectified by a rectifier 350. Rectified power is filtered and regulated, and provided to controller 310. In an embodiment, controller 310 is a commercially available microprocessor or microcontroller. Rectified power is also provided to a pickup coil 354 of a relay 352. When a control signal provided by controller 310 closes a switch 356, pickup coil 354 is energized and closes a contact of relay 352. As illustrated in FIG. 3C, the closing of the relay contact provides power to luminaire 200.

As shown in FIG. 3D, two resistances 358 and 359 form a voltage divider network. The voltage developed across resistance 359 is a reference voltage (Vref) that is provided to controller 310 as an input parameter. A current sensor 357 is coupled between relay 352 and the load prong of intelligent luminaire manager 112. Current sensor 357 generates a reference current (Iref), which is also provided to controller 310 as an input parameter. In one embodiment, current sensor 357 is a current transformer. In another embodiment, current sensor 357 is a current sensing resistor or Hall effect sensor. As described below in more detail, the input parameters Vref and Iref are used to diagnose and provide an indication of the status of luminaire 200.

Figure 3E:
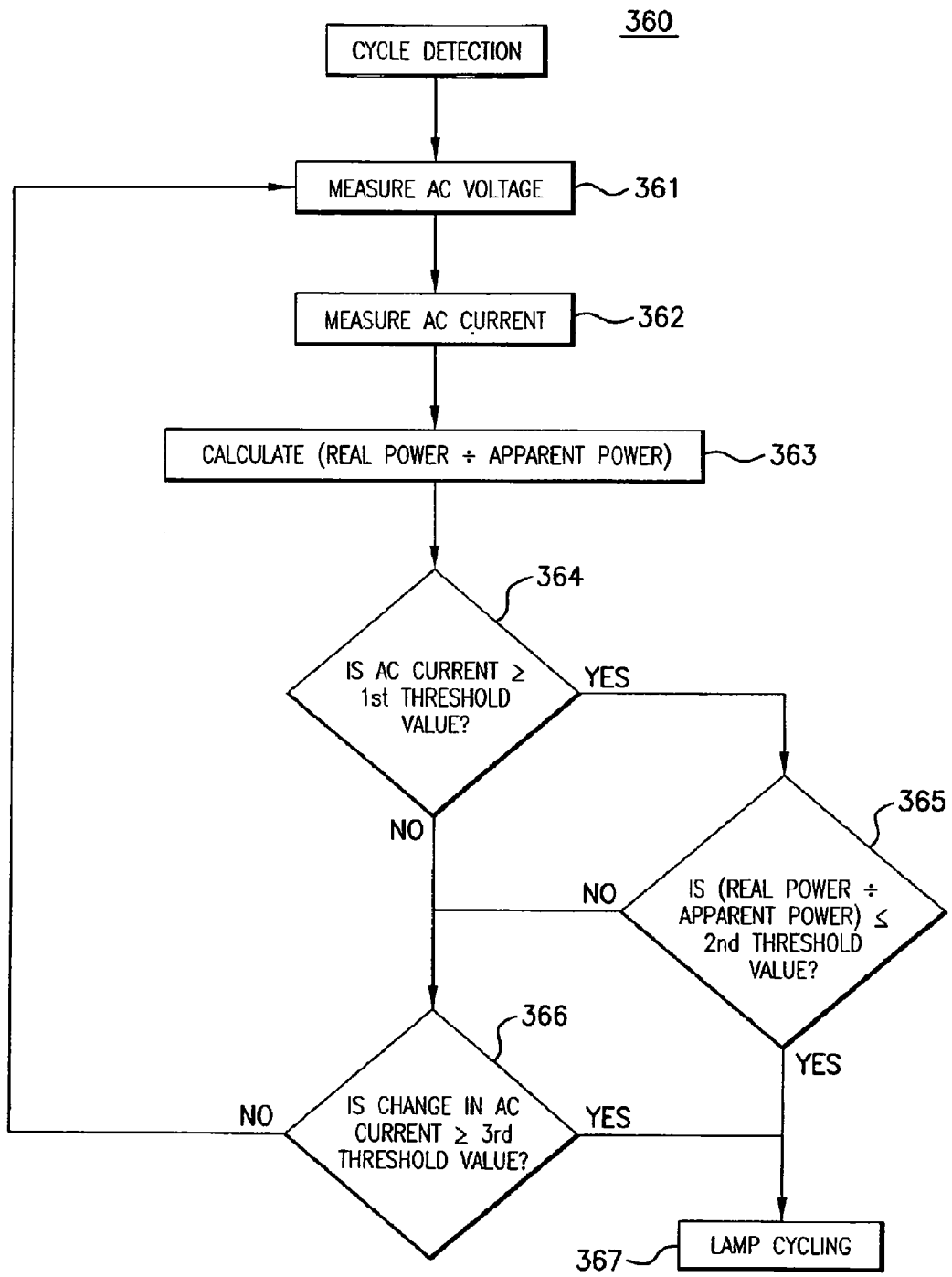
FIG. 3E is a flow chart illustrating the steps of a method for detecting cycling according to an embodiment of the present invention, which is implemented by embodiments of the intelligent luminaire manager of FIG. 3A.

FIG. 3E is a flow chart illustrating the steps of a method 360 for detecting cycling according to an embodiment of the present invention. Method 360 can be implemented by embodiments of intelligent luminaire manager 112. As shown in FIG. 3E, method 360 comprises steps 361-367.

In step 361, the input AC voltage (V.sub.AC) provided to a luminaire is measured. In an embodiment, the input AC voltage is preferably measured at a plurality of times (T.sub.i). The time intervals between measurements can be constant or variable. The frequency (.omega.) of the input AC voltage can be determined, for example, by identifying how many voltage waveform zero-crossings occur in a selected time interval.

In step 362, the input AC current (I.sub.AC) provided to the luminaire is measured. In an embodiment, the input AC current is also preferably measured at a plurality of times (T.sub.i). The time intervals between measurements can be constant or variable. The phase angle (.theta.) between the measured AC current and the AC voltage measured in step 361 can be determined, for example, by determining a time difference between the current waveform zero-crossing and the voltage waveform zero-crossing.

In step 363, a ratio between real power and apparent power is calculated (e.g., real power divided by apparent power). Both real power and apparent power are determined based on the AC voltage measurements from step 361 and the AC current measurements from step 362. Example ratios of real power divided by apparent power range from about 1 to about less than 0.1. For example, a properly working, non-power-factor-corrected luminaire having a reactor ballast and a 100 watt high pressure sodium lamp has a real power of about 120 watts and an apparent power of about 200 VA. This results in a ratio of 120/200 or 0.6. A power-factor-corrected luminaire having a reactor ballast and a 100 watt high pressure sodium lamp has a real power of about 120 watts and an apparent power of about 120 VA. This results in a ratio of 120/120 or 1.

In step 364, a determination is made whether the AC current is greater than or equal to a first threshold value. This check is performed, for example, to make sure the lamp is lit. In an embodiment, the first threshold value is about one amp. Other values can also be used. If the AC current is greater than or equal to a first threshold value, control passes to step 365. Otherwise, control passes to step 366.

In step 365, a determination is made whether the ratio of real power to apparent power calculated in step 363 is less than or equal to a second threshold value. The second threshold value can be selected, for example, based on the particular luminaire (e.g., fixture type and lamp type) to be monitored, or it can be a more general value that is selected to work with multiple luminaires (e.g., various combinations of fixture types and lamp types). For example, a value of 0.4 could be selected to monitor both a non-power-factor-corrected luminaire having a reactor ballast and a 100 watt high pressure sodium lamp and a power-factor-corrected luminaire having a reactor ballast and a 100 watt high pressure sodium lamp. If the ratio calculated in step 363 is less than the second threshold value, control passes to step 367 (Lamp Cycling). Otherwise, control passes to step 366.

Persons skilled in the relevant arts will know how to select a second threshold value given the description herein. It is a feature of method 360 that in step 365 cycling can be detected for a wide variation of luminaires (e.g., luminaires having lamps with an operating power of about 70 watts to about 1000 watts).

In step 366, a determination is made whether there has been a change in the AC current that is greater than or equal to a third threshold value. For example, in one embodiment, a determination is made after lamp startup whether the current measured in step 362 has increased or decreased more than about 25% in a one second interval. If there has been a 25% change in current, the lamp is identified as cycling unless, for example, there was an interruption in AC power. Other threshold values can be used, and persons skilled in the relevant arts will know how to select a third threshold value given the description herein. This test works well, for example, with luminaires having lamps with an operating power of about 70 watts to about 400 watts. If the change in AC current is greater than or equal to the third threshold value, control passes to step 367 (Lamp Cycling). Otherwise, control passes to step 361.

In step 367, a signal is generated to indicate that the lamp has cycled. In certain applications, a counter may be used to keep track of how many times a lamp has cycled, for example, during a single night. Once a predetermined number of cycles have occurred, power to the lamp may be switched off to prevent damage of the luminaire.

As will be understood by persons skilled in the relevant art, method 360 can be modified, for example, to delete one of the two depicted cycling tests or to add additional cycling tests.

Figure 3F:
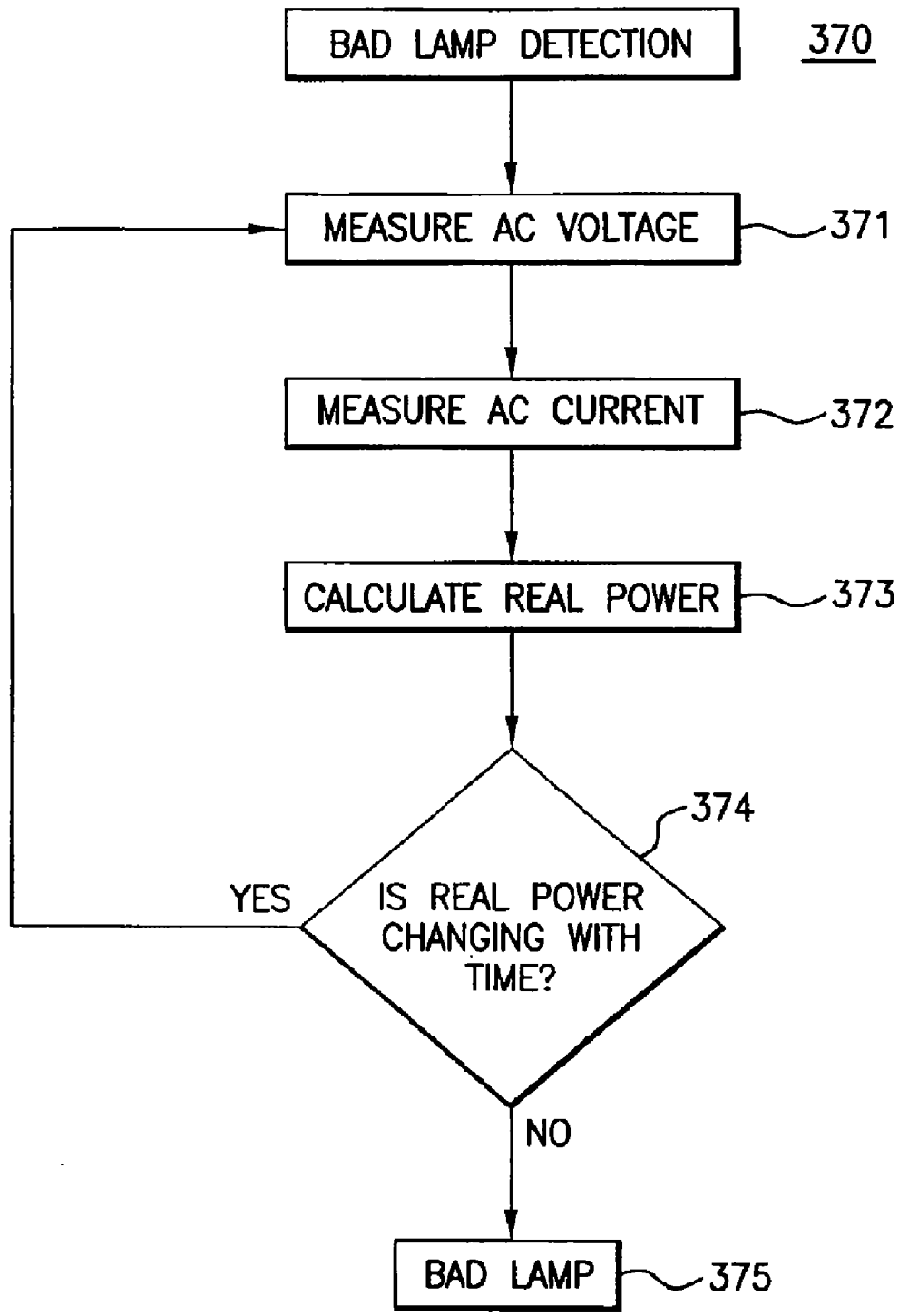
FIG. 3F is a flow chart illustrating the steps of a method for detecting a bad lamp according to an embodiment of the present invention, which is implemented by embodiments of the intelligent luminaire manager of FIG. 3A.

FIG. 3F is a flow chart illustrating the steps of a method 370 for detecting a bad lamp of a luminaire according to an embodiment of the present invention. Method 370 can be implemented by embodiments of intelligent luminaire manager 112. As shown in FIG. 3F, method 370 comprises steps 371-375.

In step 371, the input AC voltage ($V_{AC}$) provided to a luminaire is measured. In an embodiment, the input AC voltage is preferably measured at a plurality of times ($T_i$). The time intervals between measurements can be constant or variable. The frequency ($\omega$) of the input AC voltage can be determined, for example, by identifying how many voltage waveform zero-crossings occur in a selected time interval.

In step 372, the input AC current ($I_{AC}$) provided to the luminaire is measured. In an embodiment, the input AC current is also preferably measured at a plurality of times ($T_i$). The time intervals between measurements can be constant or variable. The phase angle ($\theta$) between the measured AC current and the AC voltage measured in step 371 can be determined, for example, by determining a time difference between the current waveform zero-crossing and the voltage waveform zero-crossing.

In step 373, real power being consumed is calculated. Real power is determined based on the AC voltage measurements from step 371 and the AC current measurements from step 372. In an embodiment, real power is calculated, for example, at times 0 seconds, 10 seconds, 60 seconds, and 600 seconds after an attempt to start the lamp. Other times can also be used.

In step 374, a determination is made whether real power is changing during an expected startup time of the lamp. If no change in real power is detected, control passes to step 375 (Bad Lamp). Otherwise, control passes to step 371.

In step 375, a signal is generated to indicate that the lamp is bad.

Figure 3G:
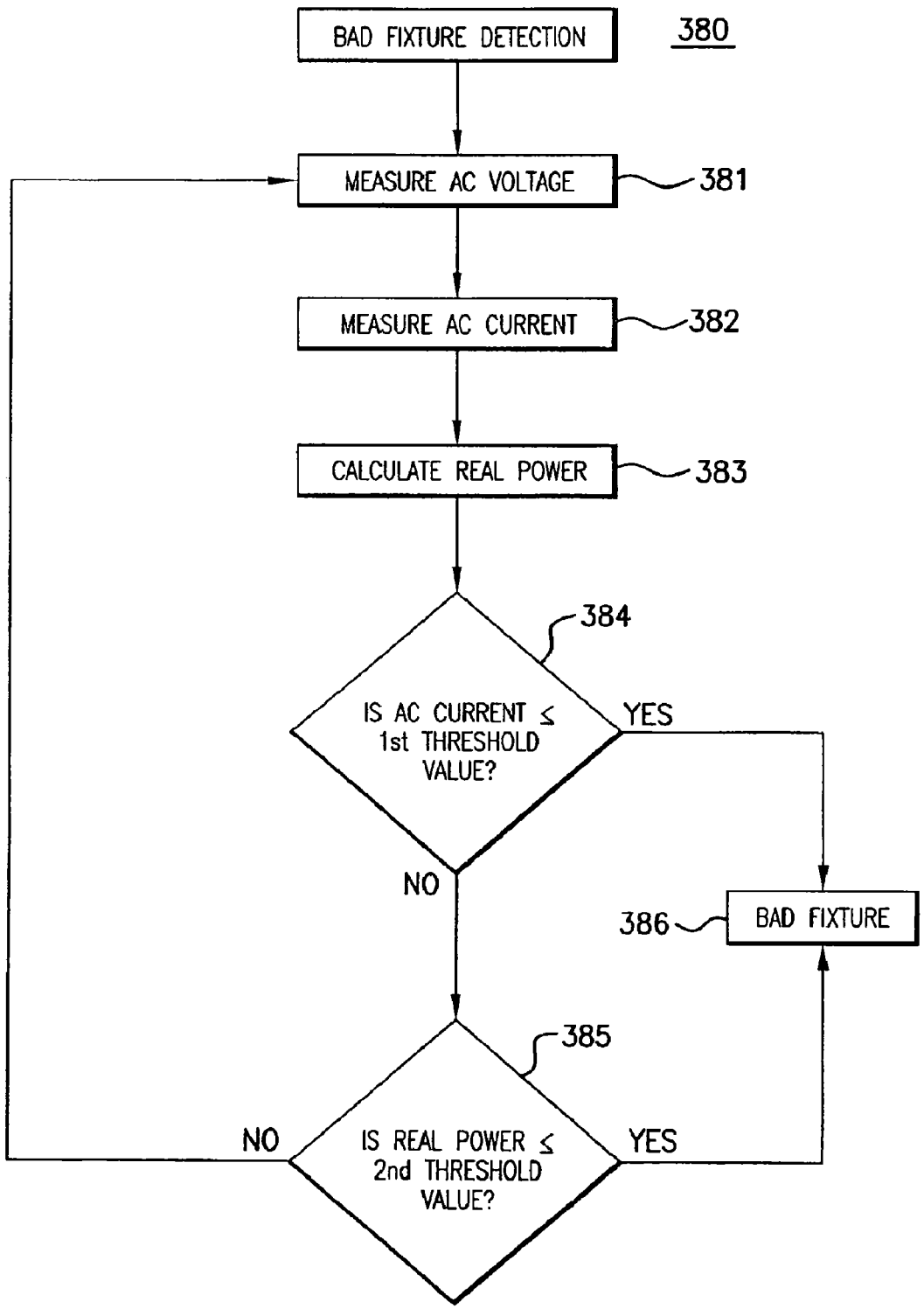
FIG. 3G is a flow chart illustrating the steps of a method for detecting a bad fixture according to an embodiment of the present invention, which is implemented by embodiments of the intelligent luminaire manager of FIG. 3A.

FIG. 3G is a flow chart illustrating the steps of a method 380 for detecting a bad fixture of a luminaire according to an embodiment of the present invention. Method 380 can be implemented by embodiments of intelligent luminaire manager 112. As shown in FIG. 3G, method 380 comprises steps 381-386.

In step 381, the input AC voltage ($V_{AC}$) provided to a luminaire is measured. In an embodiment, the input AC voltage is preferably measured at a plurality of times ($T_i$). The time intervals between measurements can be constant or variable. The frequency ($\omega$) of the input AC voltage can be determined, for example, by identifying how many voltage waveform zero-crossings occur in a selected time interval.

In step 382, the input AC current ($I_{AC}$) provided to the luminaire is measured. In an embodiment, the input AC current is also preferably measured at a plurality of times ($T_i$). The time intervals between measurements can be constant or variable. The phase angle ($\theta$) between the measured AC current and the AC voltage measured in step 381 can be determined, for example, by determining a time difference between the current waveform zero-crossing and the voltage waveform zero-crossing.

In step 383, real power being consumed is calculated. Real power is determined based on the AC voltage measurements from step 381 and the AC current measurements from step 382.

In step 384, a determination is made whether the AC current is less than or equal to a first threshold value. In one embodiment, a threshold value of about 0.2 amps is used. Other values can also be used. If the AC current is less than or equal to the first threshold value, control passes to step 386. Otherwise, control passes to step 385. In an embodiment, a current of less than about 0.2 amps indicates, for example, either a bad fixture, ballast or a bad starter.

In step 385, a determination is made whether the real power is less than or equal to a second threshold value. In one embodiment, a threshold value of about 40 watts is used. Other values can also be used. If the real power is less than or equal to the second threshold value, control passes to step 386. Otherwise, control passes to step 381. In an embodiment, a power of less than 40 watts is an indication, for example, of an open ballast, a bad starter, an open lamp, or a broken wire.

In step 386, a signal is generated to indicate that the fixture is bad.

Figure 3H:
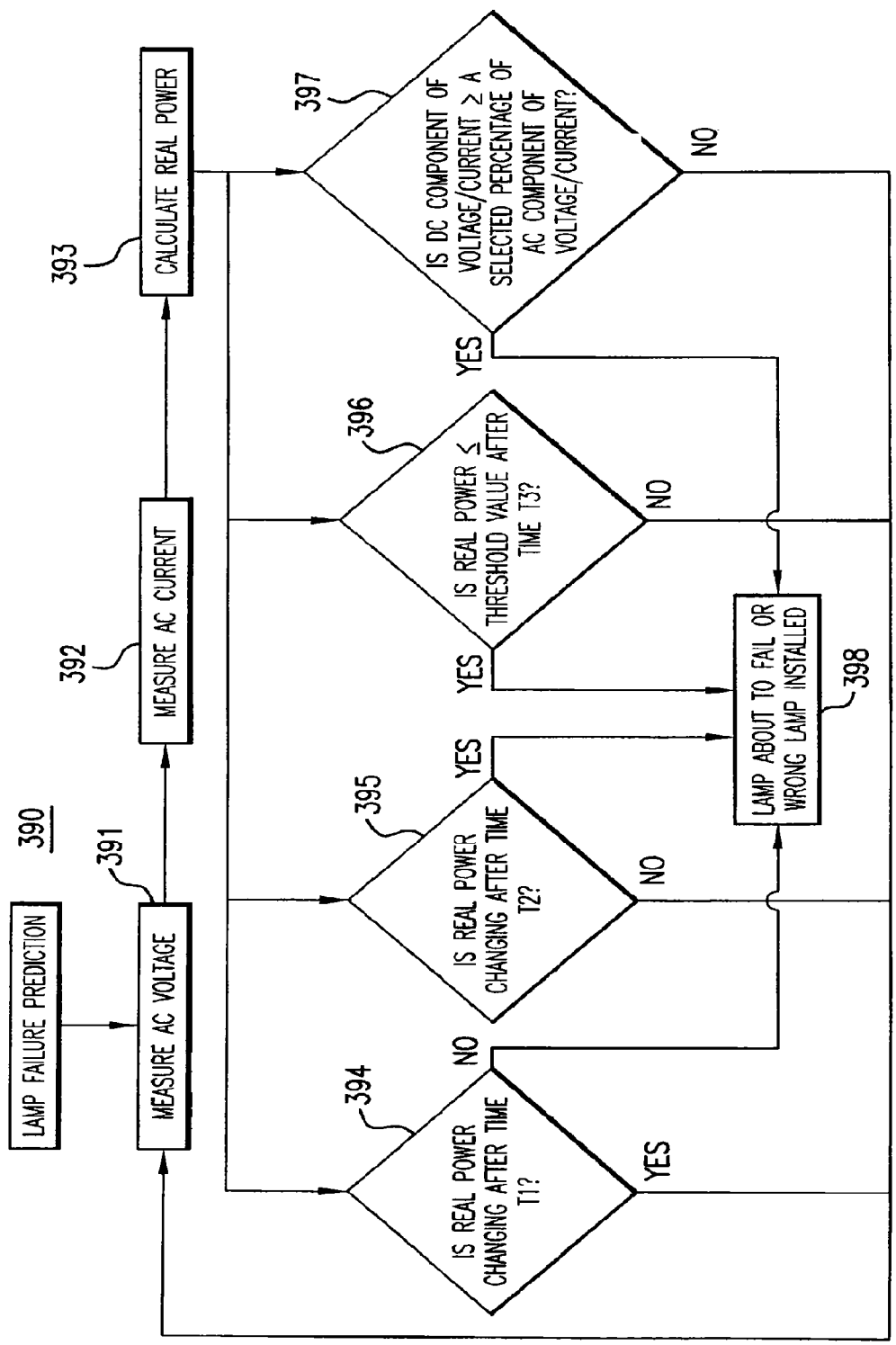
FIG. 3H is a flow chart illustrating the steps of a method for predicting lamp failure according to an embodiment of the present invention, which is implemented by embodiments of the intelligent luminaire manager of FIG. 3A.

FIG. 3H is a flow chart illustrating the steps of a method 390 for predicting lamp failure of a luminaire according to an embodiment of the present invention. Method 390 is based, for example, on the lamp curves shown in FIG. 3I below. Method 390 can be implemented by embodiments of intelligent luminaire manager 112. As shown in FIG. 3H, method 390 comprises steps 391-398.

In step 391, the input AC voltage ($V_{AC}$) provided to a luminaire is measured. In an embodiment, the input AC voltage is preferably measured at a plurality of times ($T_i$). The time intervals between measurements can be constant or variable. The frequency ($\omega$) of the input AC voltage can be determined, for example, by identifying how many voltage waveform zero-crossings occur in a selected time interval.

In step 392, the input AC current (I.sub.AC) provided to the luminaire is measured. In an embodiment, the input AC current is also preferably measured at a plurality of times (T.sub.i). The time intervals between measurements can be constant or variable. The phase angle (.theta.) between the measured AC current and the AC voltage measured in step 391 can be determined, for example, by determining a time difference between the current waveform zero-crossing and the voltage waveform zero-crossing.

In step 393, real power being consumed is calculated. Real power is determined based on the AC voltage measurements from step 391 and the AC current measurements from step 392.

In step 394, a determination is made whether real power is changing after time T1. In an embodiment, T1 is about 2 minutes. This value is based on curve A1 in FIG. 3I. Other values can also be used. If real power is not changing, control passes to step 398. Otherwise, control passes to step 391.

In step 395, a determination is made whether real power is changing after time T2. In an embodiment, T2 is about 6 minutes. This value is based on curve C1 in FIG. 3I. Other values can also be used. If real power is changing, control passes to step 398. Otherwise, control passes to step 391.

In step 396, a determination is made whether real power is less than or equal to a threshold value after time T3. In an embodiment, the threshold value is about 50 watts and T3 is about 6 minutes. These value are based on curve B1 in FIG. 3I. Other values can also be used. The threshold value is selected, for example, based on the power of the lamp to be monitored. If real power is less than or equal to the threshold value after time T3, control passes to step 398. Otherwise, control passes to step 391.

In step 397, a determination is made whether a DC component of voltage/current is greater than or equal to a selected percentage of the AC component of voltage/current. A relatively large DC component of voltage/current is an indication of rectification. Lamps usually cycle, however, before rectification problems occur. If the DC component of voltage/current is greater than or equal to a selected percentage of the AC component of voltage/current, control passes to step 398. Otherwise, control passes to step 391.

In step 398, a signal is generated to indicate the lamp is about to fail. This signal may also indicate that the wrong type lamp has been installed, if it occurs soon after lamp replacement. If the lamp has been installed and operating properly for a period of time, one can deduce that the correct lamp was initially installed and thus the installed lamp is one that is about to fail.

As will be understood by persons skilled in the relevant art, method 390 can be modified, for example, to delete one of the depicted predictive tests, such as the DC component test, or to add additional predictive tests.

FIG. 3I is a graph illustrating fixture power as a function of time during startup of a gas discharge lamp. As shown in FIG. 3I, the graph is divided into three regions: A, B, and C. Region B represents operation of lamps, during startup, that still have remaining useful life. Curve B1 is an example curve showing the startup of a good lamp. Regions A and C represent operation of lamps, during startup, that are about to fail. Curve A1 represents startup of a lamp that has reached the end of its useful life. Curve C1 represents startup of a lamp, for example, that has a leaking gas tube. As described above, FIG. 3I is useful for predicting when a lamp is about to fail.

Based on the description of the present invention contained herein, it will become apparent to persons skilled in the relevant arts that some or all of the functions and/or functionality described with regards to intelligent luminaire manager 112 herein can be implemented, for example, as an integral part of luminaire 200. Similarly, functions and/or functionality described with respect to luminaire 200 (e.g., starter 306) can be implemented as a part of intelligent luminaire manager 112. Thus, the illustration and description of specific functions and functionality residing in luminaire 200 and/or intelligent luminaire manager 112 is illustrative and not intended to limit the present invention.

Figure 4A:
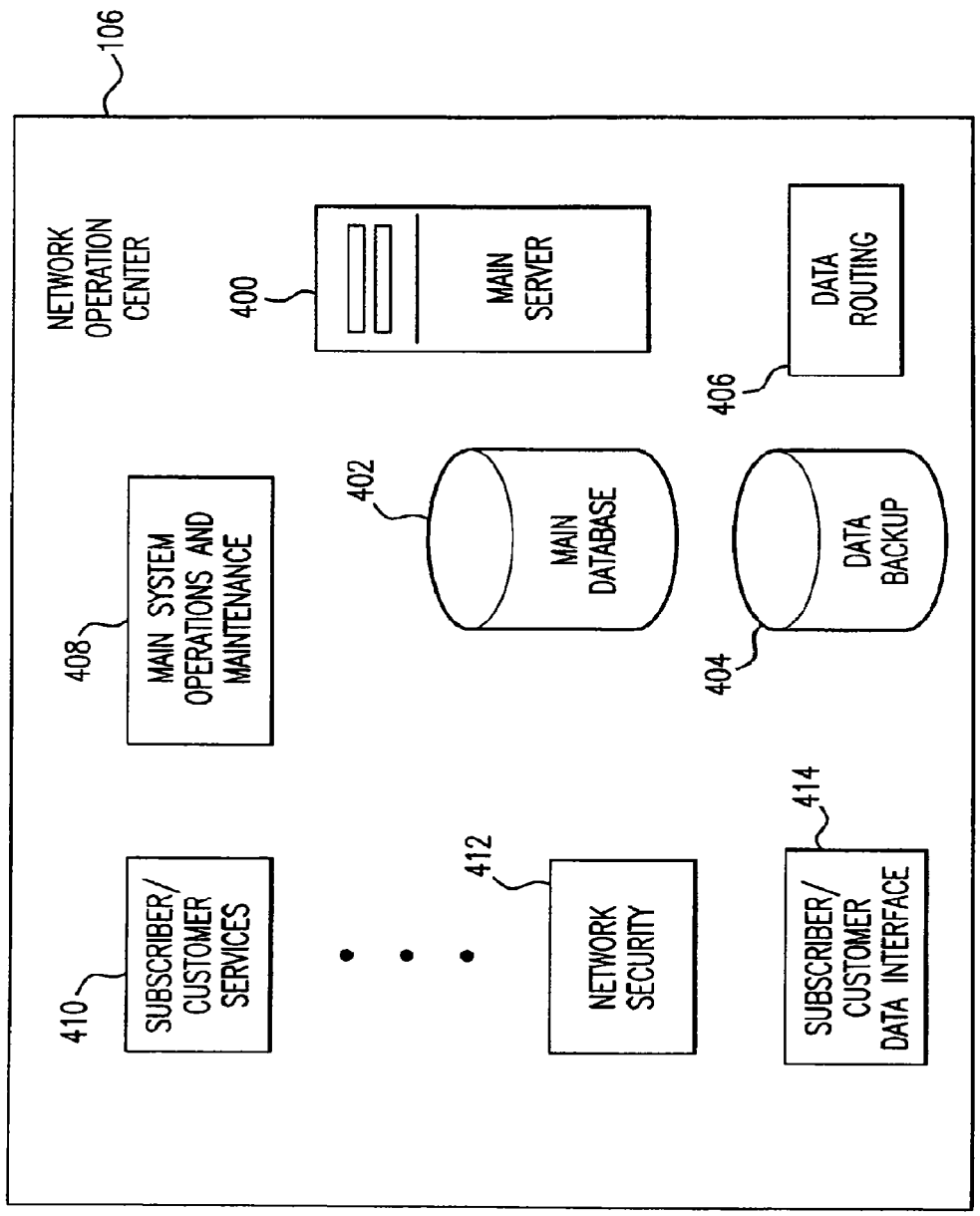
FIG. 4A is a diagram illustrating a network operation center according to an embodiment of the present invention.

FIG. 4A is a more detailed depiction of a network operation center 106 according to an embodiment of the present invention. As shown in FIG. 4A, network operation center 106 includes a main server 400, a main database 402, data backup 404, and data routing capabilities 406.

As will become apparent from the description herein, network operation center 106 provides many services, such as, for example, main data network system operation and maintenance 408, subscriber/customer services 410, network security services 412, and subscriber/customer data interface services 414. As used herein, the term subscriber/customer refers to a light system owner/operator 108 and/or a third party user 110.

In one embodiment, network operation services provided by network operation center 106 personnel include six major components: subscriber provisioning, network provisioning, traffic engineering, billing, service assurance, and security management. Subscriber provisioning refers to subscriber management, subscriber selection, and subscriber activation. Network provisioning refers to capacity planning, network design, and device provisioning. Traffic engineering refers to network traffic analysis and policy management. Billing refers to, for example, both settlement of accounts between and amongst subscriber/customers, and usage data collection, rating, invoicing, and collection of bills. In an embodiment, network operations center 106 records customer information for each intelligent luminaire manager 112 that can be used by owner/operators 108 to support customer service queries and reports and billing of their respective customers. Service assurance refers to asset management, performance management, service-level management, fault management, trouble management, and work-force management. Security management refers to access fraud, service fraud, management access control, and denial of service. The goal of these network services is to provide a framework that provides scalability for a unified wide-area network platform that can be easily managed and controlled in real time, for example, over the internet using either standard web browsers or customer-specific applications developed within a software framework. Like the physical hardware of the network, the software is scalable.

Scalability of the system can be ensured by distributing the necessary software over multiple servers. In addition, this increases both redundancy and reliability. A communications software program maintained by network operation center 106 provides a virtual private network for each gateway to the network operation center (e.g., master controllers 114). Network operation center 106 is capable of supporting many thousands of concurrent subscribers. Notable features of network operation center 106 include its store and forward data management technology; its management environment that supports and controls a massive subscriber base of mobile computers, integrated servers and web service users; its security and data independence that facilitates supporting large numbers of separate customers and their sensitive business data; and its ability to provide fast, secure, and highly-available synchronization between servers and the subscriber/customer populations they support.

In an embodiment, network operation center 106 is capable, for example, of being scaled to support up to about 120,000 master controllers or more and up to about 60 million intelligent luminaire manager nodes or more, which could handle traffic of about 1 megabyte of data per day per gateway or master controller 114.

In an embodiment, network operation center 106 records GPS coordinates for each node location (e.g., the locations of intelligent luminaire managers 112). This data is used to generate user display maps of node locations and to support workforce management reports that include node locations.

Network operation center 106, based on data collected, also is able to provide detailed information to its subscribers/customer regarding the type of fixture, lamp type, ballast type, and starter type operated by each intelligent luminaire manager 112. Additionally, network operation center 106 software is able to generate summary failure analysis reports, broken down by lighting system attributes such as, for example, fixture type, lamp type, ballast type, starter type, and hours of operation. This analysis is provided to specific customers and/or all customers, based on how often a component fails or requires a service call. The analysis preferably includes failure conditions identified by the network as well as information provided to call centers about the failures.

In an embodiment, a time stamp is provided with data packet transported via a network such that resolution about events on the network can be identified, for example, within one minute. If a luminaire 200 controlled by an intelligent luminaire manager 112 fails, it preferably takes about one minute in this embodiment before an alarm is generated at an associated owner/operator's site. This alarm preferably displays both the location of the failed luminaire and the time of failure.

As shown in FIG. 4A, network operation center 106 maintains a database 402 that includes the current status of all nodes in the data network system. In an embodiment, the bandwidth of the network is such that it can support video. In an embodiment, network operation center 106, via the networks 102, forwards requests from subscribes/customers for information, such as, for example, current voltage levels at monitored devices, value of meters, power usage by individual devices, etc. Routine message traffic is preferably scheduled to occur at certain intervals. Examples are network status, device status, abnormal line voltage, power quality, tilt sensor to alert of pole failure, air quality, road conditions, for example, monitored by a video camera linked into the network, et cetera. The period of these reporting intervals is programmable (e.g., from one-hour to 24-hour intervals in 15 minute increments or less). Event or alarm reporting is preferably handled on a priority basis, and it does not conform to a routine forwarding schedule.

In an embodiment, when the alarm data is received at network operation center 106, it is compared to predetermined action stored in a program, and the actions are carried out as described. For example, the network operation center may send an email to certain individuals, a map showing the location of the failed device, and/or generate a work order by interfacing with a subscriber/customer's work-order program. The type of data sent from network operations center 106 to a subscriber/customer is not limited, but in practical terms may be limited in its usefulness to a subscriber/customer based on ability to receive and use the data.

In an embodiment, the message traffic passed between network operation center 106 and intelligent luminaire managers 112 includes applications data packages, query command packages, device status packages, event and alarm packages, and network status packages. Subscriber/customer access to this data stored at the network operation center is controlled by password. Subscriber/customer notification of events is transmitted to the subscriber/customer, and no password is required to obtain this data.

In an embodiment, network operation center 106 is able to identify when there is a power failure effecting a subscriber/customer's light system and when backup power is being used at master controls 114. For a system-wide power outage, network operation center 106 can consolidate alarm reports and generate a generalized message that is forwarded to an effected subscriber/customer (e.g., a light-system owner/operator 108).

As noted above, in the event of a power failure or a network failure such that a master controller 114 cannot provide data to network operation center 106 on a scheduled interval, the data is maintained at the master controller 114 until power and communications are restored. The stored data is then forwarded at the next scheduled reporting interval, unless specifically requested earlier by a subscriber/customer In an embodiment, master controller 114 includes battery back-up power. In another embodiment, master controller 114 is capable of transmitting an "I've Lost Power" signal when power is lost.

Network operation center 106 is responsible for IP protocol traffic analysis. Traffic is routed such that it is able to support peak loading of the data network and still pass data. In order to manage data, subscriber/customer commands may be limited during certain unexpected peak loads and held until bandwidth becomes available to forward this traffic. When a bandwidth limitation is being reached in a network 102, an alarm is sent to network operation center 106 so that traffic can be managed accordingly to control the peak load. Network operation center 106 personnel can monitor traffic loading on the network and install additional capacity as required.

In an embodiment, as noted above, network operation center personnel perform asset management functions, which include tracking the life cycle of node equipment, and replacing end-of-life equipment or degraded equipment before failure. For light system owner/operators 108, network operation center 106 data analysis programs can track the complete life of a device (e.g., the time it was installed, the number of hours it was operated, and a cause of failure).

Network security services 412 control access to the information stored by network operation center 106 using firewalls and prevent unauthorized access/network usage to prevent compromise of the data and/or network. In an embodiment, network security services 412 require both authentication and authorization. Security techniques are implemented to prevent denial-of-service attacks and virus attacks that would cause the networks to fail or breakdown. Network security services 412 also preferably include intrusion tracking and the ability to trace and combat malicious acts by unauthorized users. In an embodiment, a "call home" feature is used such that when a request for information or service is sent from a subscriber/customer to network operation center 106, the request is repeated and sent back to the subscriber/customer's known address by network operation center 106 to verify that the request actually came from that subscriber/customer. Network security services 412 also employ and support data encryption.

In an embodiment, network operation center 106 as a part of its subscriber/customer service provides monthly reports summarizing asset status of monitored devices to subscribers/customers. Additionally, in an embodiment, network operation center 106 sends messages to light system managers when a light is turned on and when it is turned off so that the light system manager can keep track of the present status of the light system assets.

Figure 4B:
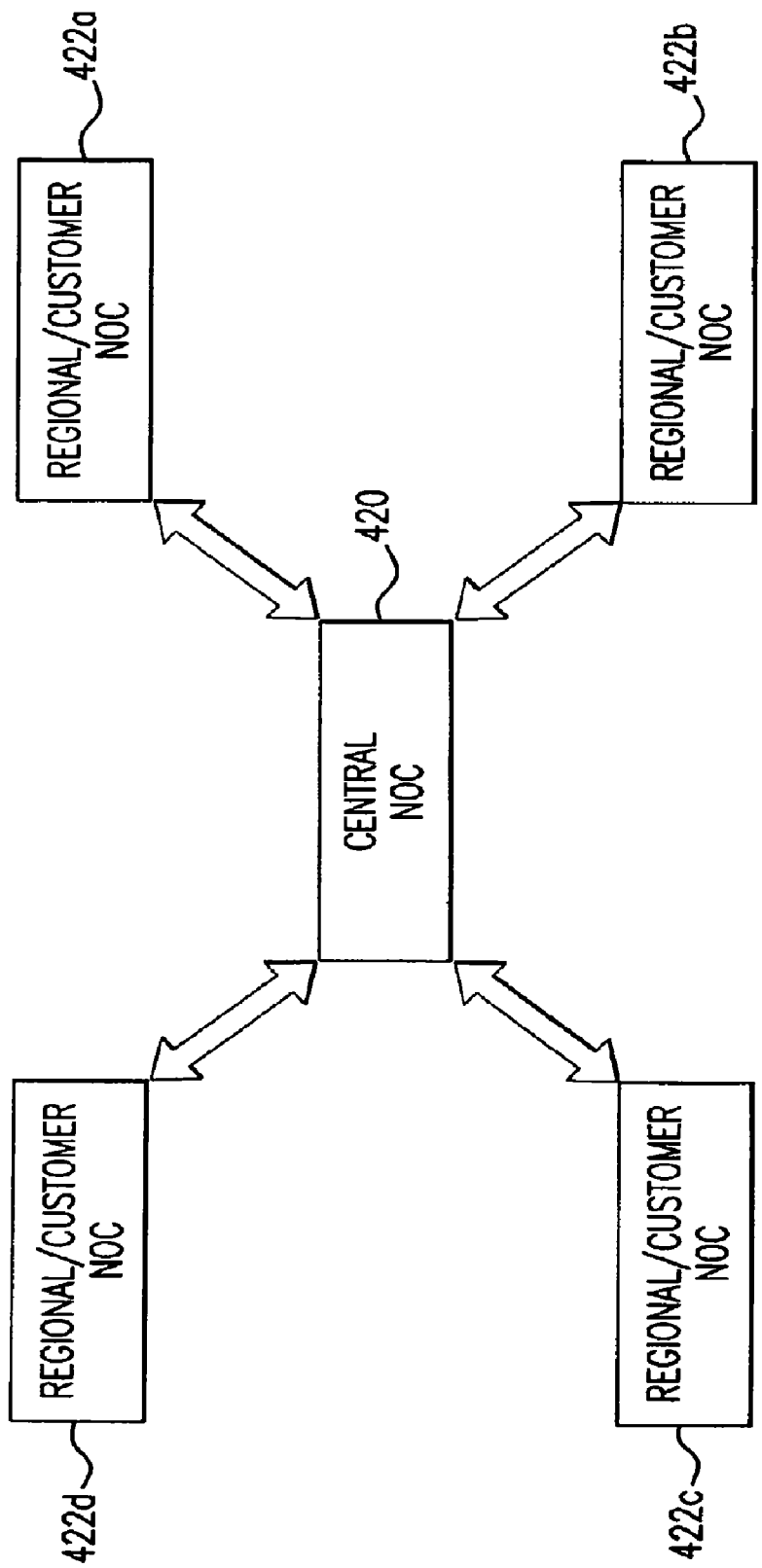
FIG. 4B is a diagram illustrating geographically distributed network operational centers according to an embodiment of the present invention.

FIG. 4B illustrates another embodiment of a network operation center according to the present invention. As shown in FIG. 4B, all the functions and functionality of network operation center 106 described above need not reside at a single geographical location. This functionality can be distributed over a wide geographical area. As shown in FIG. 4B, in an embodiment, the functionality of network operation center 106 is distributed across a central network operation center (NOC) 420 and one or more regional/customer network operation centers 422.

Figure 5A:
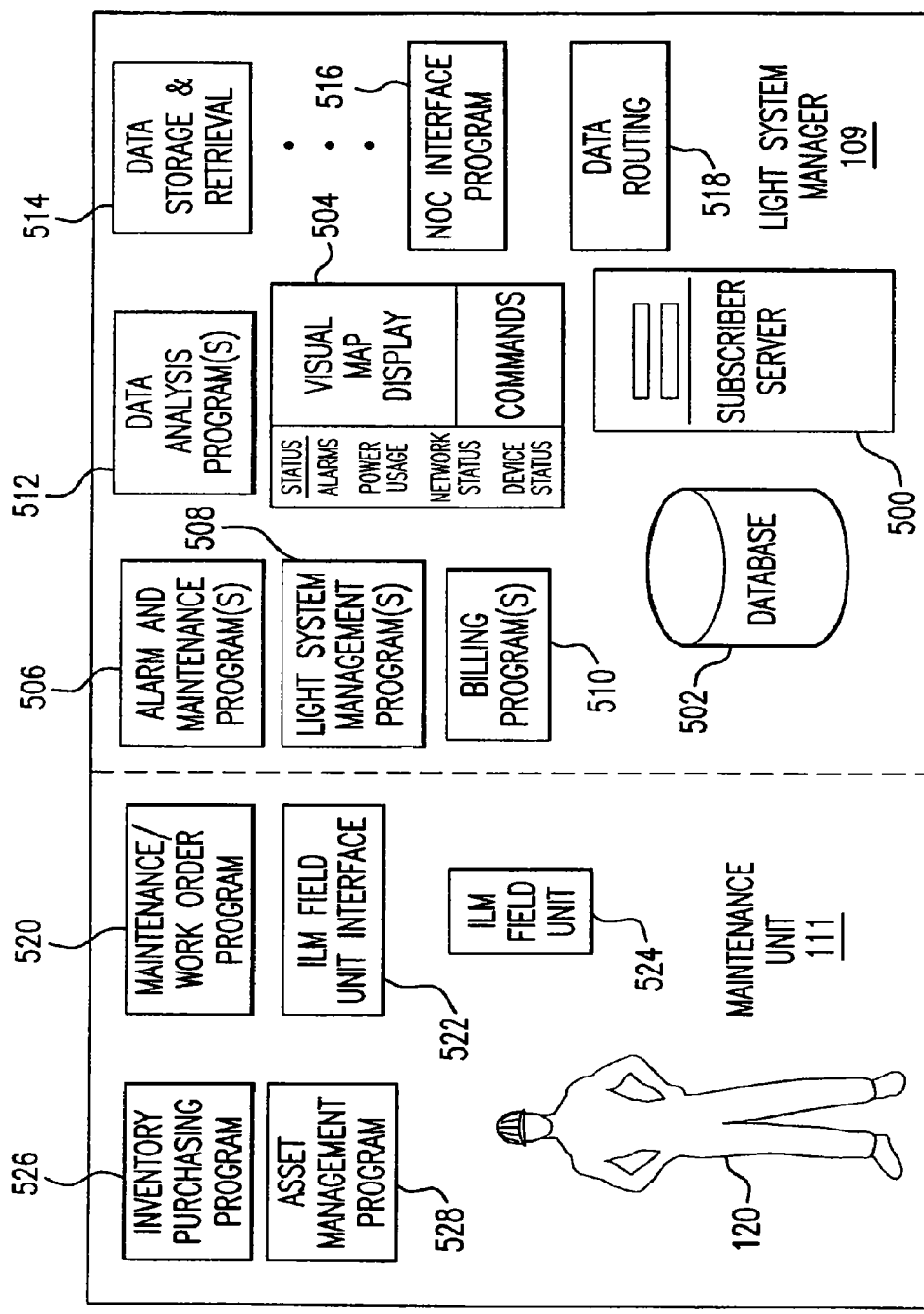
FIG. 5A is a diagram illustrating a light system owner/operator according to an embodiment of the present invention.

FIG. 5A depicts a light system owner/operator 108. As shown in FIG. 5A, owner/operator 108 is divided into a light system manager portion 109 and a maintenance unit portion 111. The light system manager portion includes a subscriber server 500, a database 502, and a computer display 504.

Computer display 504 presents, in both a text and a graphical manner, information about the owner/operator's light system. The text and graphical information includes, for example, the status of any alarms, power usage, network status, and device status. The status is also shown graphically on a visual map display. In one embodiment, a graphical user interface presents a visual photometric mapping to a user, for example, of selected lights of the light system. This photometric mapping can provide the user with a visual representation of the illumination, for example, of a parking lot, a sports field, or other area of interest. The bottom portion of computer screen 504 shows commands being entered and responses being received from network operation center 106.

The light system manager preferably has the ability to run several programs at his or her site. These programs include alarm and maintenance (e.g., repair dispatch) program(s) 506, light system management program(s) 508, billing program(s) 510, data analysis program(s) 512, a data storage and retrieval program 514, a network operation center interface program 516, and a data routing program 518. Each of these programs is further described below.

Alarm and maintenance program(s) 506 displays an alarm such that maintenance personnel 120 can take corrective action. In an embodiment, the program uses data that has been analyzed, for example, by network operation center 106 and schedules maintenance so that equipment in the field close to the end of its useful operating life can be replaced prior to failure. For better predictability, this end of life analysis can be based on a larger population of equipment than only that owned and operated by a particular light system manager.

Light management program(s) 508 are used by the light system manager to reprogram devices in the field. Examples of this include, for example, turning lights on and lights off using a schedule rather than having them simply turn on at dusk and off at dawn.

Billing program(s) 510 keep track of when specific lights are used and generates customer bills accordingly. In one embodiment, the rate charged for turning on and using a particular light can be based on the time it is turned on (e.g., during peak hours of operation or off-peak hours of operation).

Data analysis program(s) 512 maintain the state of components in use in a light system and compare, for example, each component's total time in use to an estimated life expectancy to predict a remaining time to failure for the component. When a component is at its expected end of life, the data generated by program(s) 512 can be used to create a work order to have maintenance personnel 120 replace the component before it fails, for example, by interacting with a maintenance/work order program 520.

Data storage and retrieval program(s) 514 facilitate the storage and retrieval of data at the light manager's site in database 502.

Network operating system interface program 516 is used to interface with network operation center 106. This interface program is useful, for example, for transmitting data to and receiving data from intelligent luminaire managers 112 installed on the light system manager's equipment.

Data routing program 518 parses and routes data received from network operation center 106.

On the maintenance unit side, there is included a maintenance work order program 520, an intelligent luminaire manager field unit interface device 522, and an intelligent luminaire manager field unit 524. Also included are an inventory purchasing program 526 and an asset management program 528.

In an embodiment, when an alarm or maintenance requirement is sent to the light system manager by network operation center 106, it is automatically routed to maintenance/work order program 520. This program then automatically generates a work order that can be acted upon by a maintenance worker. An electronic copy of the work order can be downloaded to intelligent luminaire manager field unit 524 via intelligent luminaire manager field unit interface 522.

In an embodiment, intelligent luminaire manager field unit 524 is a hand-carried portable device that can be taken on-site while installing and/or servicing a luminaire 200. Information about the installation and/or service is captured by intelligent luminaire manager field unit 524 for subsequent entry into the records of the light system owner/operator 108. Upon return of the maintenance worker to the maintenance unit, the collected information is uploaded from the field unit into maintenance records. In an embodiment, this uploaded information is forwarded to network operation center 106 where it is stored and analyzed along with information gather by maintenance units of other light system owner/operators.

In an embodiment, alarms generated by an intelligent luminaire manager 112 are not cleared until replacement/service information is received at network operation center 106.

In an embodiment, inventory purchasing program 526 keeps track, for example, of stock on hand and causes equipment to be ordered and stocked based on information collected from intelligent luminaire managers 112.

The asset management program 528 is a program that modifies asset management data received, for example, from network operation center 106 to satisfy particular light system owner/operator data requirements.

Based on the description of the present invention contained herein, it will become apparent to persons skilled in the relevant arts that any or all of the functions and/or functionality described with regards to network operation center 106 can be implemented, for example, by a light system owner/operator 108. Similarly, any or all of the functions and/or functionality described with respect to a light system owner/operator can be implemented by network operation center 106. Thus, the illustration and description of specific functions and functionality residing at a particular location or with a particular entity is illustrative and not intended to limit the present invention.

Figure 5B:
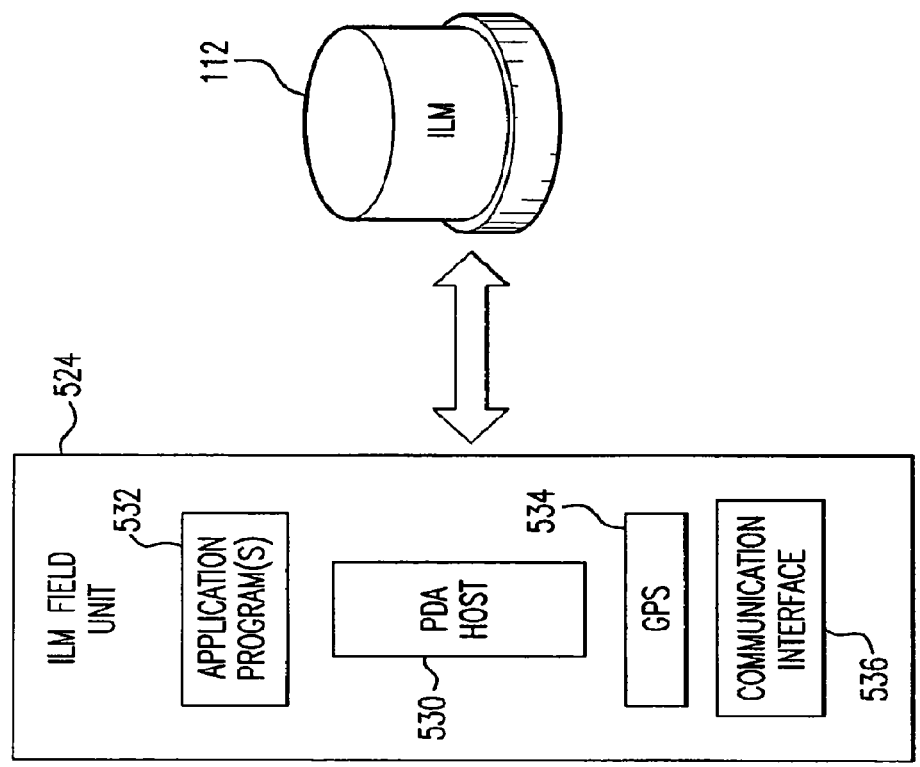
FIG. 5B is a diagram illustrating an intelligent luminaire manager field unit according to an embodiment of the present invention.
Figure 5B:
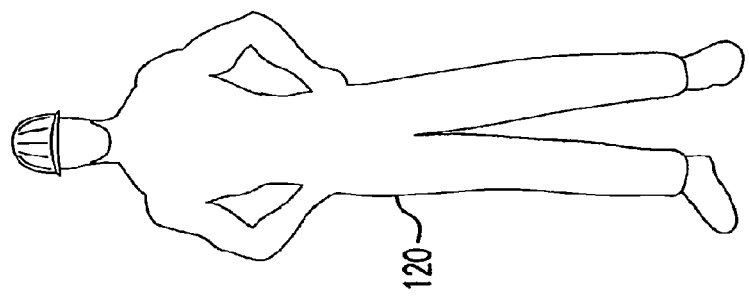

FIG. 5B further illustrates intelligent luminaire manager field unit 524. Field unit 524 is used, for example, to activate newly installed or serviced intelligent luminaire managers 112.

In an embodiment, field unit 524 includes an on-board GPS system 534 and a communications interface 536. The communications interface can communicate, for example, with an intelligent luminaire manager or other device using RF and/or optical communications. Using the GPS 534, the field unit identifies the location where an intelligent luminaire manager 112 is installed. This information is stored, for example, in memory 320 of intelligent luminaire manager 112. It is also taken back to the maintenance unit and stored in the maintenance unit's records. Additionally, it is forwarded to network operation center 106 via the light manager's subscriber/customer interface to network operation center 106. Other information collected and forwarded to network operation center 106 includes, for example, all the particulars about the equipment monitored and controlled by the intelligent luminaire manager 112 (e.g., lamp type, ballast type, digital photo, etc.).

In embodiments of the present invention, for example where more than one intelligent luminaire manager 112 may be installed at the same geographical location (e.g., in a situation where two luminaires are attached to a single pole and each luminaire has its own intelligent luminaire manager 112), field unit 524 can be used to assign a unique identification value to each of the luminaire managers.

Once an intelligent luminaire manager 112 is installed, it self-configures by running a configuration program. Once alive, network 102 notifies network operation center 106, via master controller 114, that a new device has entered the network.

In an embodiment, field unit 524 is hosted by a PDA 530, running application program(s) 532. The present invention is not limited, however, to requiring the use of a PDA. Map base reports downloaded to field unit 524 show the location of each luminaire in a light system and display efficient driving routes for maintenance crews to get to a luminaire requiring repair. Fault types are communicated to crews via network operation center 106 and field unit 524 for pre-diagnostics of a failed luminaire so that time on-site is minimized and the need for return trips to a failed luminaire are eliminated. In an embodiment, the type of faults and corrective actions that can be provided to maintenance crew workers include anticipated lamp cycling, lamp cycling, no starting pulse, starting pulse but failed to start, non-reporting unit, replace lamp when traveling to area, replace lamp, replace starter, check power at fixture, if no power repair power, and if power replace intelligent luminaire manager unit. As will be understood by persons skilled in the relevant arts, this list is illustrative and not intended to limit the present invention.

It is a feature of the present invention that during activation of a new intelligent luminaire manager 112, each unit is identified both in terms of its type of luminaire and its GPS location. This data, coupled with the failure mode reporting, allows for a much greater maintenance crew efficiency. Additionally, dedicated, less-costly maintenance crews are able to conduct all maintenance during daylight hours, rather than nighttime, at significantly lower cost.

In an embodiment, when an intelligent luminaire manager 112 is removed from service, its identification number is captured by field unit 524. If the GPS coordinates of the removed intelligent luminaire manager 112 differ from what is expected (e.g., by more than a couple of meters) an alert/alarm is generated or initiated by field unit 524 and preferably provided to network operation center 106. The alarm is an indication, for example, that (1) the removed intelligent luminaire manager 112 was originally installed improperly (e.g., at the wrong location or with the wrong GPS coordinates); (2) the removed intelligent luminaire manager 112 has been moved since its activation without proper authority; or (3) the data stored by the removed intelligent luminaire manager 112 has been corrupted.

While the foregoing is a complete description of exemplary embodiments of the invention, it should be evident that various modifications, alternatives and equivalents may be made and used. For example, although the intelligent luminaire manager of the present invention is described as controlling luminaires having conventional lamps, it will be apparent to individuals skilled in the relevant arts given the description herein that the intelligent luminaire manager can be adapted to manage other types of lighting such as, for example, light emitting diodes. In addition, the intelligent luminaire manager of the present invention can also be adapted to manage other electromechanical devices. Thus, it is not limited to managing only luminaires. Accordingly, the above description should not be taken as limiting the scope of the invention.

The invention claimed is:

1. A method for managing a plurality of luminaires, comprising:
   receiving, by a network operation center via one or more master controllers, information for a plurality of luminaires from a plurality of networked intelligent luminaire managers, each networked intelligent luminaire manager being coupled to an associated luminaire and configured to monitor and communicate a status of the associated luminaire;
   storing, by the network operation center, the received information; and
   routing, by the network operation center, received information for a first group of luminaires to a first computer associated with an operator of the first group of luminaires,
   wherein the network operation center comprises one or more servers.

2. The method of claim 1, further comprising:
   routing, by the network operation center via one or more master controllers, information for a second group of luminaires to a second computer associated with an operator of the second group of luminaires.

3. The method of claim 1, further comprising:
   receiving, by the network operation center, a command from the computer associated with the operator of the first group of luminaires to turn-on or turn-off a particular luminaire;
   storing, by the network operation center, the command; and
   routing, by the network operation center via one or more master controllers, the command to the networked intelligent luminaire manager coupled to the particular luminaire.

4. The method of claim 1, wherein the received information includes information about usage of each luminaire, further comprising:
   generating, by the network operation center, a bill for a particular group of luminaires based on the received information.

5. The method of claim 1, further comprising:
   adjusting a flow of communications between selected networked intelligent luminaire managers.

6. The method of claim 1, further comprising:
   sending, by the network operation center, an alarm to the first computer associated with the operator of the first group of luminaires if status information is received indicating that a particular luminaire of the first group of luminaires is not functioning properly.

7. The method of claim 6, wherein the sending step comprises at least one of: (i) sending location information for the particular luminaire, (ii) sending time of failure information for the particular luminaire, or (iii) sending type of failure information for the particular luminaire.

8. The method of claim 1, further comprising:
analyzing, by the network operation center, the received information; and
generating, by the network operation center a report based on the analysis.

9. The method of claim 8, wherein the generating step comprises: generating a failure analysis report.

10. The method of claim 1, further comprising: sending billing information to the first computer associated with the operator of the first group of luminaires.

11. The method of claim 1, further comprising: sending network status information to the first computer associated with the operator of the first group of luminaires.

12. The method of claim 1, further comprising: sending power usage information to the first computer associated with the operator of the first group of luminaires.

13. A method for managing a plurality of luminaires, comprising:
receiving, by a network operation center via one or more master controllers, information for a plurality of luminaires from a plurality of networked intelligent luminaire managers, each networked intelligent luminaire manager being coupled to an associated luminaire and configured to monitor and communicate a status of the associated luminaire;
routing, by the master controller or the network operation center, information for a first group of luminaires to a first computer associated with an operator of the first group of luminaires;
receiving, by the network operation center, a command from the first computer associated with the operator of the first group of luminaires to turn on turn-on or turn-off a particular luminaire; and
routing, by the network operation center via one or more master controllers, the command to the networked intelligent luminaire manager coupled to the particular luminaire, thereby enabling the networked intelligent luminaire manager to turn-on or turn-off the particular luminaire,
wherein the network operation center comprises one or more servers.

14. The method of claim 13, further comprising:
sending, by the network operation center, an alarm to the first computer associated with the operator of the first group of luminaires if information is received indicating that a particular luminaire of the first group of luminaires is not functioning properly.

15. The method of claim 14, wherein the sending step comprises:
sending location information for the particular luminaire; and
sending time of failure information for the particular luminaire.

16. The method of claim 13, further comprising:
adjusting a flow of communications between selected networked intelligent luminaire managers.

17. The method of claim 13, further comprising:
analyzing, by the network operation center, the received information; and
sending, by the network operation center, a report based on the analysis to the first computer associated with the operator of the first group of luminaires.

18. A system, comprising:
a database, and
at least one server, wherein the at least one server is configured to:
receive, via one or more master controllers, information for a plurality of luminaires from a plurality of networked intelligent luminaire managers, each networked intelligent luminaire manager being coupled to an associated luminaire and configured to monitor and communicate a status of the associated luminaire;
store, in the database, the received information; and
route the received information for a first group of luminaires to a first computer associated with an operator of the first group of luminaires.

19. The system of claim 18, wherein the at least one server is further configured to:
receive a command from the computer associated with the operator of the first group of luminaires to turn-on or turn-off a particular luminaire;
store, in the database, the command; and
route, via one or more master controllers, the command to the networked intelligent luminaire manager coupled to the particular luminaire.

20. The system of claim 18, wherein the received information includes information about usage of each luminaire, and wherein the at least one server is further configured to:
generate a bill for a particular group of luminaires based on the received information.

* * * * *